United States Patent
Reis et al.

(10) Patent No.: US 12,147,989 B1
(45) Date of Patent: Nov. 19, 2024

(54) DELEGATING AUTHENTICATION ACROSS APPLICATIONS

(71) Applicant: Block, Inc., San Francisco, CA (US)

(72) Inventors: Steven H. Reis, Boston, MA (US); Vasilii Trofimchuk, Vancouver (CA)

(73) Assignee: Block, Inc., Oakland, CA (US)

( * ) Notice: Subject to any disclaimer, the term of this patent is extended or adjusted under 35 U.S.C. 154(b) by 0 days.

(21) Appl. No.: 17/244,601

(22) Filed: Apr. 29, 2021

(51) Int. Cl.
| | |
|---|---|
| *G06Q 20/40* | (2012.01) |
| *G06F 8/41* | (2018.01) |
| *G06F 16/245* | (2019.01) |
| *G06Q 20/32* | (2012.01) |
| *G06Q 20/38* | (2012.01) |
| *H04L 9/32* | (2006.01) |
| *H04W 12/041* | (2021.01) |
| *H04W 12/06* | (2021.01) |
| *H04W 12/08* | (2021.01) |
| *G06Q 20/20* | (2012.01) |

(52) U.S. Cl.
CPC ......... *G06Q 20/40975* (2013.01); *G06F 8/44* (2013.01); *G06F 16/245* (2019.01); *G06Q 20/3226* (2013.01); *G06Q 20/326* (2020.05); *G06Q 20/3829* (2013.01); *H04L 9/3271* (2013.01); *H04W 12/041* (2021.01); *H04W 12/06* (2013.01); *H04W 12/08* (2013.01); *G06Q 20/204* (2013.01); *G06Q 20/3274* (2013.01); *G06Q 20/3278* (2013.01); *G06Q 20/40145* (2013.01); *H04L 9/3231* (2013.01)

(58) Field of Classification Search
CPC ......... G06Q 20/40975; G06Q 20/3226; G06Q 20/326; G06Q 20/3829; G06Q 20/204; G06Q 20/3274; G06Q 20/3278; G06Q 20/40145; G06F 8/44; G06F 16/245; H04L 9/3271; H04L 9/3231; H04W 12/041; H04W 12/06; H04W 12/08
See application file for complete search history.

(56) References Cited

U.S. PATENT DOCUMENTS

| | | | |
|---|---|---|---|
| 8,689,294 B1 * | 4/2014 | Thakur | H04L 63/08 726/16 |
| 10,607,212 B2 * | 3/2020 | Sheets | G06Q 20/3829 |
| 11,410,165 B1 * | 8/2022 | Cohen | G06Q 20/34 |
| 11,501,297 B1 * | 11/2022 | Tai | G06Q 20/02 |

* cited by examiner

*Primary Examiner* — Patrick Mcatee
*Assistant Examiner* — Nakia Leffall-Allen
(74) *Attorney, Agent, or Firm* — Lee & Hayes, P.C.

(57) ABSTRACT

Techniques described herein are directed to implementing three-domain secure (3DS) solutions in a software development kit (SDK), and more generally, improving the process of authenticating user transactions in third-party merchant applications. In an example, a user may enroll in the delegated authentication service offered by the authentication service provider as a result of conducting a payment transaction in a first application having the SDK. During a subsequent transaction, initiated in an unassociated second application having the compiled SDK, the user may authenticate the payment method without registering the payment method with the second application and/or by delegating a 3DS authentication to the authentication service provider rather than performing the 3DS authentication with an issuer of the payment method. Additionally, techniques described herein may configure a user device, without access to an internet connection, as a standalone payment instrument.

20 Claims, 16 Drawing Sheets

DELEGATING AUTHENTICATION ACROSS APPLICATIONS

TECHNICAL FIELD

In today's commerce more and more transactions between customers and merchants occur online while transactions at brick-and-mortar locations of the merchants still remain. As such, the process for completing these transactions has continued to evolve. In some instances, transactions between customers and merchants may be facilitated through an application offered by a merchant. In addition to the above, the technology of payment instruments and payment channels used in these transactions have also advanced. This advancement in technology continues to expand the possibilities for connecting merchants and customers in commerce.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
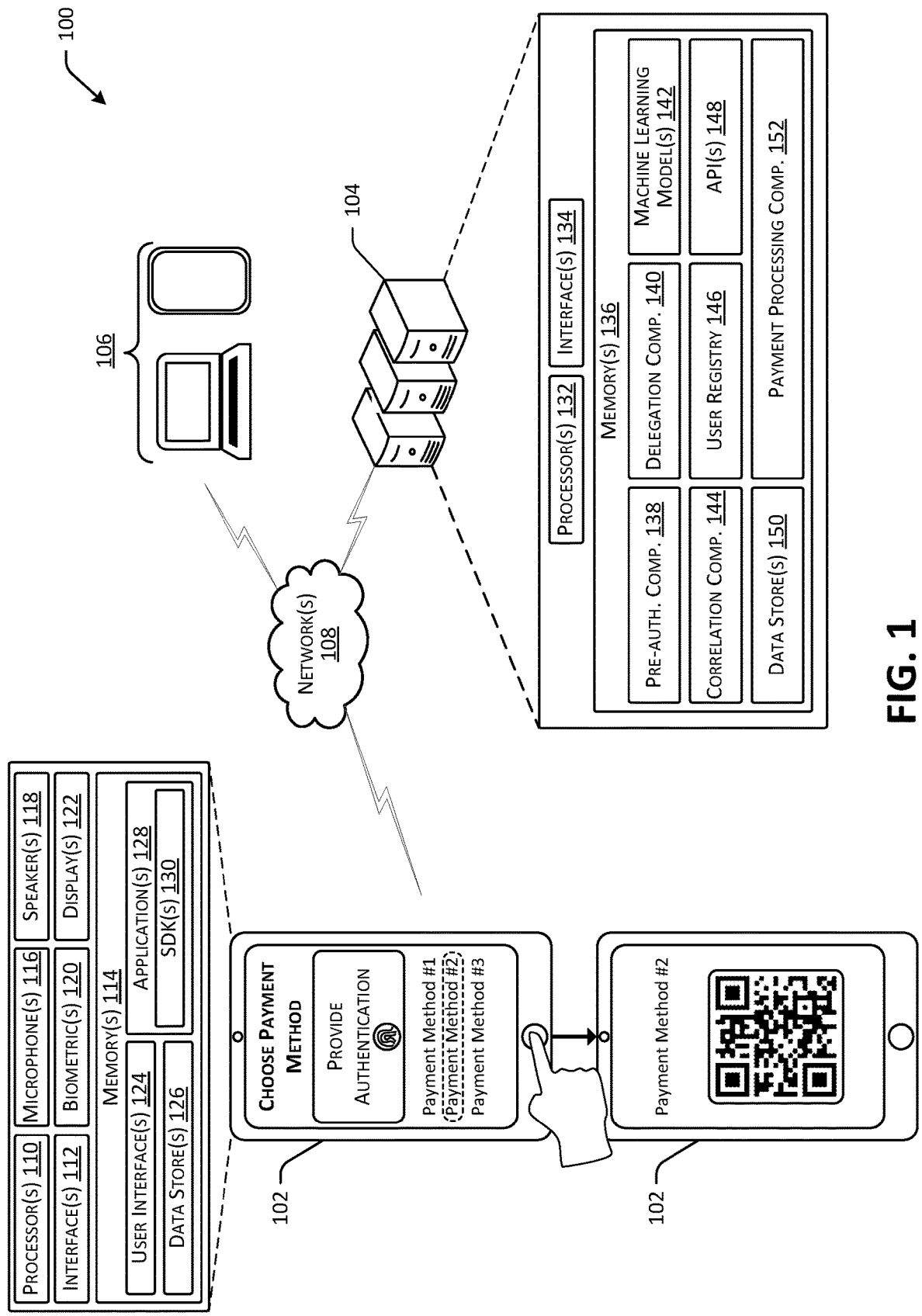
FIG. 1 illustrates an example environment for an authentication service provider system configured to delegate authentication between third-party applications and provide offline delegated payment authentication for a user device.

Techniques described herein are directed to, among other things, the implementation of three-domain secure (3DS) solutions in a software development kit (SDK), and more generally, improving the process of authenticating user transactions. As previously mentioned, the process for payment transactions between customers and merchants continues to evolve. As such, SDKs may be configured by a software developer to allow for third-party application developers to implement and utilize a functionality across various configurations of applications, devices, computing environments, and the like. Such SDK integrations into third-party applications may allow customers to shop for items online and even conduct transactions, available online or at brick-and-mortar locations, through third-party applications specific to a merchant. To render this technology available for any merchant third-party application, various authorization and/or authentication techniques are required to maintain a suitable level of security, such as, for example, a 3DS protocol, to protect any debit and/or credit accounts linked to a third-party application in the event that a user device gets lost or stolen, a user account registered with the merchant is accessed by an unauthorized person, or the like. Applying such techniques from start to finish for each individual third-party application may be a tedious task. Additionally, once a customer has registered a payment method with a third-party application, such authorization and/or authentication techniques may require one or more forms of authentication from the customer when completing a transaction (and any subsequent transactions), such as, for example, an account password, a biometric authentication (e.g., fingerprint scan, face scan, etc.), a two-factor authentication (e.g., a one-time passcode), or the like. Many merchants may attach a verification of such authentication to a payment when sending the payment for processing. Furthermore, customers are often required to leave content they are currently viewing to access another online platform (e.g., a messaging application, browser redirection, or the like) to view additional information, access an additional customer account, and/or otherwise engage in a payment flow to complete the transaction. This friction in the purchasing process detracts from customer engagement with the merchant and could potentially lead to a loss of sale opportunities for the merchant. In another implementation, a financial institution may provide functionalities for a customer to pay for transactions using a mobile device as a standalone payment instrument.

Take, for example, a financial institution having an application that stores associated payment methods that may be leveraged by a customer mobile device to pay for transactions. The customer may complete the one or more authorization and/or authentication process(es) previously described to gain access to and utilize a payment method where the mobile device may be configured as a standalone payment instrument (e.g., by displaying a code representing the payment method). While certain applications, specific to a financial institution or another payment method, may provide functionality to pay for transactions at brick-and-mortar facilities, these techniques may be rendered obsolete when a user device cannot access an internet connection to perform the various authorization and/or authentication process(es) required to conduct such a transaction. As such, a user relying on a mobile device as a payment instrument may be constrained to only shop at locations where the mobile device may access an internet connection.

Techniques described herein are directed to the generation of, in examples, authentication records, and the delegation of such authentication records between separate, unassociated first and/or third-party applications. In some implementations, pre-authentication records may be leveraged to delegate authentication from a mobile device operating in an offline mode to a point-of-sale (POS) device and complete a payment transaction. Utilizing the techniques described herein, an SDK may be provided by a service provider, such as, for example, an authentication service provider system. In some examples, the SDK may allow a third-party developer to include the authentication delegation services in their own merchant third-party application. The SDK may allow for the generation and storage of an authentication record indicating that an authorized customer is in possession of a customer device. The authentication record may be stored as an existing authentication record and may be generated in association with a successful transaction and/or customer registration with a first third-party application. The existing authentication record may be leveraged by an unassociated second third-party application to authenticate a payment transaction without the customer registering a payment method and/or performing a 3DS authentication with the second third-party application. For example, a customer may complete a registration process with a first merchant application comprising the SDK (e.g., create an account, add a payment method, authenticate and/or authorize the payment method, etc.) and purchase an item completing the transaction using the added payment method. The customer may then launch a second merchant application comprising the SDK and complete a subsequent payment transaction using the payment method registered and/or added to the first merchant application by providing a single form of authentication (e.g., a biometric input such as, for example, a fingerprint scan and/or a face scan) and without registering the payment method or performing the 3DS authentication with the second merchant application. Additionally, the authentication service provider system may be configured to generate pre-authentication records of a payment method for secure storage on customer mobile devices allowing for customers to complete payment transactions using the payment method while the mobile device is operating in an offline mode by delegating the customer authentication to backend authentication servers via a POS device. It should be appreciated that any authentication records and/or pre-authentication records described herein may be stored in a secure datastore of the customer device and/or application executing on the customer device, and may be encrypted using a cryptographic key of the device which is stored in the TEE of the customer device.

The service offered by the authentication service provider system may be integrated into a third-party merchant application via one or more SDK(s) offered by the authentication delegation platform. The SDK may comprise executable instructions and may be configured to cause an application executing on a customer device to perform various operations, such as, for example, communicating with an authentication server, via an application programming interface (API), to perform a delegated authentication process. In some examples, the delegation authentication process may comprise one or more various subprocess(es), such as, for example, an enrollment process, a subsequent transaction process, and/or a pre-authentication process.

As previously mentioned, to leverage the lower friction delegated authentication processes described herein, a customer must first enroll with the authentication service provider system. In some examples, the enrollment may be based on an initial authentication of a customer and/or a payment method associated with the customer. For example, a customer may launch a first third-party application associated with a first merchant and comprising the service provider SDK. During one or more workflows of the application, the customer may be prompted to add a payment method and/or authenticate themselves to utilize an existing payment method. The application may initiate an authentication with the issuer of the payment method, where the customer may be prompted to perform a 3DS authentication (or any other form of authentication) to prove that they are in possession of the customer device executing the application in which the transaction is taking place (or the payment method is being registered). Such a 3DS authentication may include sending a one-time code the customer device via a data exchange means unassociated with the first application (e.g., a short message service (SMS) message) where the customer may be prompted to enter the one-time code in the first application and/or a redirection within the first application, and/or a redirection to an additional application.

Once the authentication is complete, the issuer may transmit the authentication record (e.g., a cryptogram) to the customer device, the application, and/or the authentication service provider. The customer device may then generate a private/public key pair. Additionally, or alternatively, the device may generate a device identifier (ID) corresponding to the device and/or the first application in which the SDK is executing. In some examples, the customer device may attach, or otherwise, store the private key portion of the pair in association with the authentication record in a trusted execution environment of the customer device. In some examples, the private key and/or authentication record may be locked, or otherwise, inaccessible unless a customer provides proper authentication. In some examples, following an authentication by the user, the private key may be accessed and used to encrypt the authentication record prior to transmission over a network. Additionally, or alternatively, the customer device may send the public key portion of the pair to the a backend server of the authentication service provider system, where the public key is stored and may be leveraged to confirm that the customer device is still in the possession of the customer and/or to confirm that the authentication record remains valid. Additionally, or alternatively, the customer device may send the device ID to the backend server of the authentication service provider system, where the device ID may be leveraged to identify the customer device and/or the first application. In examples, once the authentication record has been stored, a user may provide a biometric authentication input (e.g., a fingerprint scan, a face scan, etc.) to enroll with the authentication service provider system. At this point, the authentication service provider system has effectively delegated the authentication rights from the issuer to the merchant application. Additionally, or alternatively, the authentication to enroll with the service provider system may be delegated from the merchant application to an additional application, such as, for example, an application associated with the authentication service provider system and/or a browser application. In such an example, the authentication service provider system has effectively delegated the authentication rights from the issuer to the additional application. For example, as previously mentioned, the backend server of the authentication service provider system may initiate a cryptographic challenge, based on the public key, that requires private key portion of the pair. As such, a customer may be prompted to provide a biometric input in response to such a cryptographic challenge, where the biometric input may unlock the private key, thus providing access to the authentication record and/or providing an authentication with respect to the cryptographic challenge.

Once a customer has enrolled with the authentication service provider system, the customer may leverage the lower friction delegated authentication process(es) previously described while utilizing a separate third-party application having the integrated SDK.

For example, a customer may login or otherwise execute a second third-party application that is associated with a second merchant, and at some point, the customer may wish to execute a payment transaction within the second application. In some examples, the second application may transmit one or more probabilistic signals, as described in more detail below, to the backend server, and the backend server may send a response including instructions to generate and store in association with the second application, a second private key based on the probabilistic signals. In response to a request to initiate a payment transaction, the customer device and/or the application SDK may query the secure database for an existing authentication record, and if found, may contact the backend server associated with the authentication delegation system requesting to authenticate the customer. Additionally, or alternatively, if an existing authentication record is not found, the 3DS authentication process between the issuer and the customer may be employed. In some examples, the request may include an indication of the device ID generated by the customer device during the enrollment. The backend server may identify, in a secure data store associated with the server, the public key of the device using the device ID. The backend server may then initiate a cryptographic challenge, as previously described, configured to be solved with the private key portion of the pair. As such, the customer may then provide a biometric authentication input to unlock the private key portion (e.g., the second private key) and send a response to the cryptographic challenge, indicating that the device is still in possession of the customer and/or that the authentication record is still valid. It should be noted that an invalidation of the authentication record by the issuer may be represented in the response to the cryptographic challenge in that, while the device is still in possession of the customer, the authentication record is no longer valid.

The second application may then send transaction details to the backend server of the authentication service provider system, either in a subsequent data exchange or with the response to the cryptographic challenge. At this point, the backend server may sign the transaction details with a private key of the authentication service provider system, indicating that the device is still in possession of the customer and the authentication record remains valid, and that the delegated authentication has been successfully completed. The backend server of the authentication service provider system may then send the signed transaction details over a network to the issuer associated with the payment method. It should be noted that the signed transaction details may be received by the issuer and considered as an equal level of authentication as if the issuer had performed the 3DS authentication with the customer as described with respect to the enrollment process.

As previously mentioned, the private/public key pair generated by the customer device may be associated with the first application, as the key pair was generated in response to the initiated transaction in the first application. The private key portion may be configured to be shared between the first application, the second application, and any other application on the customer device having the SDK. In some examples, the authentication service provider system may be configured to determine that the applications are on the same customer device. Additionally, or alternatively, the management (e.g., the storage and/or access) to the private key portion may be handled by an additional application, such as, for example, an application associated with the authentication service provider system and/or a browser application.

In some examples, the authentication service provider system may be configured to determine whether two different applications are on the same customer device based on one or more correlations between first probabilistic signals received from the first application and second probabilistic signals received from the second application. For example, throughout any of the data exchanges between the applications executing on the customer device and the backend server (e.g., upon execution of an application), the applications may transmit data indicating one or more probabilistic signals, such as, for example, global positioning system (GPS) coordinates of the customer device, transaction details (e.g., a name of the customer, information associated with the payment method, etc.), time information, behavioral indications, and the like. The backend server may be configured to determine whether two applications are executing on the same customer device based on these probabilistic signals, using various techniques, such as, a machine-learned (ML) model and/or algorithm. Once this determination has been made, the backend server may send instructions to cause the customer device to generate a second private key and store the second private key in association with the second application. Such a determination may lead to an improved customer experience resulting in less friction to complete a payment transaction using a third-party merchant application. For example, a customer is no longer required to perform a 3DS authentication (e.g., redirect to an issuer website, wait for a one-time passcode, enter the passcode, redirect back to the application, etc.) with the issuer of the payment method, and instead, may simply provide a biometric input to authenticate such a transaction, and the burden is placed on the backend server of the authentication service provider system rather than the customer.

As previously mentioned, a third-party merchant application and/or an additional application (e.g., an application associated with the authentication service provider system and/or a browser application) may be configured to generate, send, store, and manage the private/public key pairs. For example, the SDK may be configured such that the authentication performed between the customer and the authentication service provider, during either the initial enrollment process and/or a subsequent transaction process, may be redirected from the third-party merchant application to the additional application. For example, a third-party merchant application may redirect the customer to a browser application, a browser embedded in the application, and/or an application associated with the authentication service provider, where the private/public key pair may be generated, stored, and/or accessed via the browser application and/or the application associated with the authentication service provider. Optionally, in such methods where the redirect to the additional application is employed, the backend server need not rely on the probabilistic signals, and instead, the authentication record may be maintained on the single additional application (e.g., the browser or the application associated with the authentication service provider service) and leveraged by various third-party merchant applications. Additionally, or alternatively, the initial enrollment process may be employed using the redirect described above, while the third-party merchant application may be configured to generate, send, store, and manage the private/public key pairs.

Additionally, or alternatively, as previously mentioned, the SDK may further include a pre-authentication process, such that a customer device, operating in an "offline" mode (e.g., without access to an internet connection) may be configured as a valid standalone payment instrument. In some examples, during the enrollment process described herein, the customer may have an option to enable subsequent offline purchases. For example, the customer device may also store, in the same datastore as the existing authentication record and/or in a separate secure datastore, one or more pre-authentication records generated by the backend server of the authentication service provider system using the authentication record(s). The pre-authentication records may be generated and/or configured in various ways, as described in more detail below. Such a configuration of a customer device as a standalone payment instrument without the requirement of an internet connection may result in an improved customer experience. For example, in scenarios where a customer does not have a physical form of the payment method (e.g., a debit and/or credit card) and a brick and mortar location of a merchant is in a location where access to the internet is unavailable and/or severely limited, a customer would be precluded from making a purchase without the pre-authentication process(es) described herein.

As such, a customer device operating in an offline mode may be configured to leverage one or more of the pre-authentication records to convert the pre-authentication record into a code (e.g., a quick response (QR) code or a near field communication (NFC) code) that may be presented and/or communicated from the customer device to a point-of-sale (POS) device without utilizing an internet connection. For example, the pre-authentication record(s) may be received from the backend server while the customer device has access to an internet connection. The pre-authentication records may be stored in association with a private key corresponding to the application that is executing the SDK. For example, the pre-authentication records may be stored with an initial private key generated during the enrollment process, any subsequent private key generated during any subsequent transaction process, and/or any other private key generated during a separate pre-authentication process. Additionally, or alternatively, the public key portion of the paring may be communicated to the backend server for later authentication.

The private key(s) may be accessed or otherwise unlocked using the methods described above, such as, for example, providing the biometric input. Once a private key is unlocked, the private key may be utilized in an offline execution mode of the customer device to decode the pre-authentication record and convert the decoded pre-authentication value record into a code for presentation by the customer device. The code may be scannable and/or otherwise receivable by a POS device, and may be configured to cause the POS device to extract the decoded pre-authentication record value from the code and send the pre-authentication record value to the backend server of the authentication service provider system. Additionally, or alternatively, a portion of the SDK may be configured to be embedded into the POS device, such that the POS device includes the required logic to extract the pre-authentication record value from the code and send the value to the backend server. The authentication service provider may validate the pre-authentication record using the public key portion of the pair and fetch a 3DS cryptogram indication an authorization associated with the transaction. The server may send the 3DS cryptogram back to the POS device, where the POS device may then complete the transaction.

As previously mentioned, the pre-authentication records may be generated and/or configured in various ways, such as, for example, a fixed number of pre-authentication records (valid for X number of subsequent transactions, where X is any integer equal to or greater than 1), a time-based pre-authentication record, a pre-authentication record specific to a transaction and/or merchant, or any combination of the like. In some examples, the pre-authentication records may be stored in a secure datastore of the customer device and/or application executing on the customer device and may be encrypted using the private key which is stored in the TEE of the customer device.

In some examples, the pre-authentication records may be configured as a fixed number of pre-authentication records. That is, the backend server may issue any fixed number of pre-authentication records (e.g., 5). In such an example, the customer may utilize the 5 pre-authentication records to complete 5 subsequent offline transactions. Such a configuration of the pre-authentication record(s) may be useful in that a customer may conduct payment transactions using the customer device, operating in an "offline" mode as a standalone payment method. Additionally, this configuration provides a great level of security for the customer, as a tampering party (e.g., a hacker or another user in possession of the customer device) would first need to bypass the biometric authentication input to unlock the private key, and even then would only be afforded the fixed number of pre-authentication records to conduct offline transactions.

Additionally, or alternatively, the pre-authentication records may be configured as time-based pre-authentication record(s). That is, the backend server may be configured to communicate with the SDK executing in an application on the customer device to establish a function and/or algorithm for generating a time-based one-time passcode. For example, the customer device and the backend server may establish a "common knowledge" over how to generate a one-time passcode, where the customer device may utilize the private key portion of the pair to generate the code, and the backend server may utilize the public key portion of the pair to generate the code. The customer device and/or the backend server may be configured to regenerate, or otherwise alter, the code in a similar manner at a fixed interval (e.g., alter the code every minute). Then, when the private key is unlocked using the biometric input, a timestamp is encoded into the code. Once the backend server receives the code from the POS device, the backend server may reference the timestamp and validate the pre-authentication record using the code generated by the backend server at the associated point in time. Such a configuration of the pre-authentication record(s) may be useful in that a customer may conduct payment transactions using the customer device, operating in an "offline" mode as a standalone payment method. Additionally, this configuration provides a great level of security for the customer, as a tampering party (e.g., a hacker or another user in possession of the customer device) would need to bypass the biometric authentication input to unlock the private key, and in the event that the tampering party is intercepting traffic and/or spoofing data exchanges, the tampering party does not have access to the function to generate the one-time code.

Additionally, or alternatively, the pre-authentication records may be configured specific to a transaction and/or a merchant. That is, the backend server may be configured to generate pre-authentication records only valid for transactions associated with characteristics specific to the transaction and/or the merchant, such as, for example, transactions within a customer-defined transaction value (e.g., under $10), transactions associated with a particular merchant, transactions associated with a particular type of merchant, and the like. Such a configuration of the pre-authentication record(s) may be useful in that a customer may conduct payment transactions using the customer device, operating in an "offline" mode as a standalone payment method. Additionally, this configuration provides a great level of security for the customer, as a tampering party (e.g., a hacker or another user in possession of the customer device) would first need to bypass the biometric authentication input to unlock the private key, and even then would only be able to complete a transaction meeting the transaction and/or merchant specific requirements associated with the pre-authentication record(s).

The embodiments described herein relate to the utilization of new "authentication data," such as a chain of authentication including pre-authenticated records (or cryptograms). For instance, as described above, analytical models may utilize probabilistic signals to correlate events that are happening between a first application and second application. An authentication record in the first application may then be shared to a second application, such that a customer's payment made using the second application need not go through an initial enrollment authentication process, leading to less friction during a payment experience. Customer device and application specific private/public key pairs are integrated into the process to share the payment authentication via network communications in a secure manner. Additionally, a code may be generated based on a pre-authenticated cryptogram received from an authentication server and stored locally on a device. The code is then scanned at a POS system which requires logic to extract and forward an authentication value included in the code to the authentication server. The authentication SDK is integrated into the device and the POS system in a way that secures private network communications, while avoiding technical disadvantages to prior art systems with regard to multi-factor authentication, offline authentication, and security constraints.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment for an authentication service provider system configured to delegate authentication across third-party applications and offline delegated payment authentication for a user device. In FIG. 1, server(s) 104 can be associated with an authentication service provider, which can communicate with user computing devices, such as a merchant device 106 (also described herein as a merchant device and/or a merchant system) and a buyer device 102 (also described herein as a customer device), via network(s) 108. That is, the merchant device 106 and the buyer device 102 are network-connected devices that enable end users (e.g., a merchant and a buyer/customer, respectively) to access services provided by the authentication service provider (e.g., via the server(s) 104). Additional details associated with the server(s) 104, the user computing devices (e.g., 102, 106), and the network(s) 108 are described below with reference to FIGS. 13 and 14.

In at least one example, the server(s) 102 can include a payment processing component 152. The payment processing component 152 can, among other things, process transactions. That is, in at least one example, the payment processing component 152 can access payment data associated with a user, send a request for authorization of the payment data to a payment service provider, and process a transaction based on a response from the payment service provider. In other examples, the payment processing component 152 can access an account maintained by the payment processing service provider and can use funds associated with the account to process a transaction. Additional details associated with the payment processing component 152 are described below.

In at least one example, the authentication service provider can expose functionality and/or services via one or more APIs 148, thereby enabling functionality and/or services described herein to be integrated into various functional components of the environment 100. The API(s) 148, which can be associated with the server(s) 104, can expose functionality described herein and/or avail payment processing services to various functional components associated with the environment 100. At least one of the API(s) 148 can be a private API, thereby availing services and/or functionalities to functional components (e.g., applications, etc.) that are developed internally (e.g., by developers associated with the payment processing service provider). At least one of the API(s) 148 can be an open or public API, which is a publicly available API that provides third-party developers (e.g., social media service providers described herein) with programmatic access to a proprietary software application or web service of the payment processing service provider. That is, the open or public API(s) can enable functionality and/or services of the payment processing service provider to be integrated into multimedia content platforms. The API(s) 148 can include sets of requirements that govern how applications, or other functional components, can interact with one another.

In some examples, the payment processing service provider can provide third-party entities with a software developer kit ("SDK") 130 that may utilize functionality exposed by the API(s) 148. The SDK 130 can include software development tools that allow a third-party developer (i.e., a developer that is separate from the payment processing service provider) to include functionality and/or avail services as descried herein. The SDK 130 and/or the API(s) 148 may include one or more libraries, programming code, executables, other utilities, and documentation that allows a developer to directly include functionality and/or avail services described herein within an application 128, such as third-party applications 128 providing social networking services, as described herein.

In at least one example, the server(s) 104 can include, or otherwise have access to, data store(s) 150. The data store(s) 150 can store, among other types of data, user profiles and inventory records. Additionally, the server(s) 104 can include a user registry 146, which may also include user profiles and/or include associations between user profiles and merchant profiles. For instance, a user profile of the buyer can store public key portions of a private/public key pair generated in association with an application 128. In some examples, an account maintained by the authentication service provider on behalf of the buyer can be mapped to, or otherwise associated with, the user profile of the buyer. Such an account can store funds received from peer-to-peer payment transactions, deposits from employers, transfers from other accounts of the buyer, and so on. Additionally, or alternatively, a user profile of the merchant can be mapped to, or otherwise associated with, an account of the merchant (which can be maintained by the authentication service provider, a bank, or another payment service). Additional details are provided below.

As illustrated in FIG. 1, the buyer device 102 is associated with user interface(s) 124 that enable the buyer to interact with the buyer device 102. The user interface(s) 124 can be presented via web browsers, applications (e.g., desktop or otherwise dedicated, provided by the payment processing provider, provided by a third-party, etc.), or the like to enable the buyer to access functionality and/or services as described herein. Similarly, the merchant device 106 can be associated with user interface(s) which can be presented via web browsers, applications (e.g., desktop or otherwise dedicated, provided by the payment processing provider, provided by a third-party, etc.), or the like to enable the merchant to interact with the merchant device 106 and access functionality and/or services as described herein.

In at least one example, a user interface of the user interface(s) 124 can be presented via a multimedia platform (e.g., website, application, etc.) associated with a provider of multimedia content. Functionality and/or services of the authentication service provider can be integrated into the social media platform via the API(s) 148 and/or SDKs. In at least one example, the merchant can post content via the platform. In FIG. 1, the content is multimedia content, but in additional or alternative examples, the content can be any other type of content. In at least one example, the buyer can access and/or consume the content via a user interface of the user interface(s) 124 that is presented via the platform. That is, the merchant and the buyer can each access the platform via user interfaces presented via their respective devices.

In at least one example, one or more users can respond to content, for example, via comments (which can include text, images, emojis, etc.), interactions with a button or other actuation mechanism (e.g., like, dislike, funny, love, etc.), and so on. Such responses can be posted in near real-time. For instance, one or more users can respond to the multimedia content posed by the merchant.

As illustrated above, the environment 100 may include the buyer device 102, the server(s) 104, and/or the merchant device 106. The buyer device 102, in addition to the components discussed above, may include one or more components such as one or more processors 110, one or more network interfaces 112, memory 114, one or more microphones 116, one or more speakers 118, one or more biometric scanner(s) 120, and/or one or more displays 122. The microphones 116 may be configured to receive audio from the environment 100 may generate corresponding audio data, which may be utilized as discussed herein. The speakers 118 may be configured to output audio, such as audio corresponding to at least a portion of the multimedia content output by the buyer device 102. The biometric scanners 120 may be configured to receive biometric input from a buyer, such as, for example, a fingerprint scan and/or a face scan. The displays 122 may be configured to present images (which may be described as video) corresponding to at least a portion of the multimedia content output by the buyer device 102. The memory 114 may include one or more components such as the user interface(s) 124 (discussed above), one or more data store(s) 126, and/or and one or more applications 124. The applications 124 may be associated with content providers, merchants, and/or the authentication service provider. Additionally, the applications may comprise one or more SDK(s) associated with the authentication service provider. The merchant device 106 may include the same or similar components that may perform the same or similar functions. It should be noted that the merchant device 106, like the other devices and systems described herein, may take one or more forms, such as a computing device, a laptop computer, a phone, and/or components thereof, for example.

The server(s) 104 may include one or more components including, for example, one or more processors 132, one or more network interfaces 134, and/or memory 136. The memory 136 may include one or more components such as, for example, a pre-authentication component 138, a delegation component 140, one or more machine learning (ML) models 142, an a correlation component 144, a user registry 146, one or more APIs 148, one or more datastores 150, and/or the payment processing component 152. The user registry 146, APIs 148, datastores 150, and payment processing component 152 have been described above. The other components will be described below by way of example.

For example, the pre-authentication component 138 may be configured to generate and/or manage one or more pre-authentication records to be utilized by a buyer device 102 operating in an "offline" mode. The pre-authentication component 138 may generate and/or configure the pre-authentication records in various ways, such as, for example, a fixed number of pre-authentication records (valid for X number of subsequent transactions, where X is any integer equal to or greater than 1), a time-based pre-authentication record, a pre-authentication record specific to a transaction and/or merchant, or any combination of the like. In some examples, the pre-authentication records may be stored in a secure datastore 126 of the buyer device 102 and/or application 128 executing on the buyer device 102 and may be encrypted using the private key which is stored in the TEE of the buyer device 102.

The pre-authentication records allow for a buyer device 102 operating in an offline mode to leverage one or more of the pre-authentication records to convert the pre-authentication record into a code (e.g., a quick response (QR) code or a near field communication (NFC) code) that may be presented and/or communicated from the buyer device 102 to a merchant device 106, such as, for example, a point-of-sale (POS) device without utilizing an internet connection. For example, the pre-authentication record(s) may be received from the pre-authentication component 138 while the buyer device 102 has access to an internet connection. The pre-authentication records may be stored in association with a private key corresponding to the application 128 that is executing the SDK 130. For example, the pre-authentication records may be stored with an initial private key generated during the enrollment process, any subsequent private key generated during any subsequent transaction process, and/or any other private key generated during a separate pre-authentication process. Additionally, or alternatively, the public key portion of the paring may be communicated to the pre-authentication component 138 for later authentication.

The private key(s) may be accessed or otherwise unlocked using the methods described herein, such as, for example, providing the biometric input 120. Once a private key is unlocked, the private key may be utilized in an offline execution mode of the buyer device 102 to decode the pre-authentication record and convert the decoded pre-authentication value record into a code for presentation by the buyer device 102. The code may be scannable and/or otherwise receivable by a merchant device 106, and may be configured to cause the merchant device 106 to extract the decoded pre-authentication record value from the code and send the pre-authentication record value to the pre-authentication component 138 of the authentication service provider system. Additionally, or alternatively, a portion of the SDK 130 may be configured to be embedded into the merchant device 106, such that the merchant device 106 includes the required logic to extract the pre-authentication record value from the code and send the value to the pre-authentication component 138. The pre-authentication component 138 may validate the pre-authentication record using the public key portion of the pair and fetch a three-domains secure (3DS) cryptogram indication an authorization associated with the transaction. The pre-authentication component 138 may send the 3DS cryptogram back to the merchant device 106, where the merchant device 106 may then complete the transaction.

In some examples, the pre-authentication records may be configured as a fixed number of pre-authentication records. That is, pre-authentication component 138 may issue any fixed number of pre-authentication records (e.g., 5). In such an example, the customer may utilize the 5 pre-authentication records to complete 5 subsequent offline transactions. Such a configuration of the pre-authentication record(s) may be useful in that a customer may conduct payment transactions using the buyer device 102, operating in an "offline" mode as a standalone payment method. Additionally, this configuration provides a great level of security for the customer, as a tampering party (e.g., a hacker or another user in possession of the customer device) would first need to bypass the biometric authentication input 120 to unlock the private key, and even then would only be afforded the fixed number of pre-authentication records to conduct offline transactions.

Additionally, or alternatively, the pre-authentication records may be configured as time-based pre-authentication record(s). That is, the pre-authentication component 138 may be configured to communicate with the SDK 130 executing in an application 128 on the buyer device 102 to establish a function and/or algorithm for generating a time-based one-time passcode. For example, the buyer device 102 and the pre-authentication component 138 may establish a "common knowledge" over how to generate a one-time passcode, where the buyer device 102 may utilize the private key portion of the pair to generate the code, and the pre-authentication component 138 may utilize the public key portion of the pair to generate the code. The customer device and/or the backend server may be configured to regenerate, or otherwise alter, the code in a similar manner at a fixed interval (e.g., alter the code every minute). Then, when the private key is unlocked using the biometric input 120, a timestamp is encoded into the code. Once the pre-authentication component 138 receives the code from the POS device, the pre-authentication component 138 may reference the timestamp and validate the pre-authentication record using the code generated by the pre-authentication component 138 at the associated point in time. Such a configuration of the pre-authentication record(s) may be useful in that a customer may conduct payment transactions using the buyer device 102, operating in an "offline" mode as a standalone payment method. Additionally, this configuration provides a great level of security for the customer, as a tampering party (e.g., a hacker or another user in possession of the customer device) would need to bypass the biometric authentication input 120 to unlock the private key, and in the event that the tampering party is intercepting traffic and/or spoofing data exchanges, the tampering party does not have access to the function to generate the one-time code.

Additionally, or alternatively, the pre-authentication records may be configured specific to a transaction and/or a merchant. That is, the pre-authentication component 138 may be configured to generate pre-authentication records only valid for transactions associated with characteristics specific to the transaction and/or the merchant, such as, for example, transactions within a customer-defined transaction value (e.g., under $10), transactions associated with a particular merchant, transactions associated with a particular type of merchant, and the like. Such a configuration of the pre-authentication record(s) may be useful in that a customer may conduct payment transactions using the buyer device 102, operating in an "offline" mode as a standalone payment method. Additionally, this configuration provides a great level of security for the customer, as a tampering party (e.g., a hacker or another user in possession of the customer device) would first need to bypass the biometric authentication input 120 to unlock the private key, and even then would only be able to complete a transaction meeting the transaction and/or merchant specific requirements associated with the pre-authentication record(s).

The delegation component 140 may be configured to delegate authentication rights from the issuer to a third-party merchant application 128 via one or more process(es) described herein. For example, the delegation component 140 may be configured to handle an initial enrollment process. In some examples, the enrollment may be based on an initial authentication of a buyer (or customer) and/or a payment method associated with the customer. For example, a customer may launch a first third-party application 128 associated with a first merchant and comprising the service provider SDK 130. During one or more workflows of the application 128, the customer may be prompted to add a payment method and/or authenticate themselves to utilize an existing payment method. The application 128 may initiate an authentication with the issuer of the payment method, where the customer may be prompted to perform a 3DS authentication (or any other form of authentication) to prove that they are in possession of the buyer device 102 executing the application 128 in which the transaction is taking place (or the payment method is being registered). Such a 3DS authentication may include sending a one-time code the buyer device 102 via a data exchange means unassociated with the first application 128 (e.g., a short message service (SMS) message) where the customer may be prompted to enter the one-time code in the first application 128 and/or a redirection within the first application 128, and/or a redirection to an additional application 128.

Once the authentication is complete, the issuer may transmit the authentication record (e.g., a cryptogram) to the buyer device 102 and/or the first application 128. The buyer device 102 may then generate a private/public key pair. Additionally, or alternatively, the device 102 may generate a device identifier (ID) corresponding to the device 102 and/or the first application 128 in which the SDK 130 is executing. In some examples, the buyer device 102 may attach, or otherwise, store the private key portion of the pair in association with the authentication record in a trusted execution environment of the buyer device 102. In some examples, the private key and/or authentication record may be locked, or otherwise, inaccessible unless a customer provides proper authentication. In some examples, following an authentication by the customer, the private key may be accessed and used to encrypt the authentication record prior to transmission over a network. Additionally, or alternatively, the buyer device 102 may send the public key portion of the pair to the delegation component 140 of the authentication service provider system, where the public key is stored and may be leveraged to confirm that the buyer device 102 is still in the possession of the customer and/or to confirm that the authentication record remains valid. Additionally, or alternatively, the customer device may send the device ID to the delegation component 140 of the authentication service provider system, where the device ID may be leveraged to identify the buyer device 102 and/or the first application 128.

In examples, once the authentication record has been stored, a customer may provide a biometric authentication input 120 (e.g., a fingerprint scan, a face scan, etc.) to enroll with the authentication service provider system. At this point, the delegation component 140 of the authentication service provider system has effectively delegated the authentication rights from the issuer to the merchant application 128. Additionally, or alternatively, the authentication to enroll with the service provider system may be delegated from the merchant application 128 to an additional application 128, such as, for example, an application associated with the authentication service provider system and/or a browser application. In such an example, the delegation component 140 has effectively delegated the authentication rights from the issuer to the additional application. For example, as previously mentioned, the delegation component 140 of the authentication service provider system may initiate a cryptographic challenge, based on the public key, that requires private key portion of the pair. As such, a customer may be prompted to provide a biometric input 120 in response to such a cryptographic challenge, where the biometric input 120 may unlock the private key, thus providing access to the authentication record and/or providing an authentication with respect to the cryptographic challenge.

As previously mentioned, a third-party merchant application 128 and/or an additional application 128 (e.g., an application associated with the authentication service provider system and/or a browser application) may be configured to generate, send, store, and manage the private/public key pairs. For example, the SDK 130 may be configured such that the authentication performed between the customer and the delegation component 140, during either the initial enrollment process and/or a subsequent transaction process, may be redirected from the third-party merchant application 128 to the additional application 128. For example, a third-party merchant application 128 may redirect the customer to a browser application 128, a browser embedded in the third-party application 128, and/or an application associated with the authentication service provider, where the private/public key pair may be generated, stored, and/or accessed via the browser application and/or the application associated with the authentication service provider.

Optionally, in such methods where the redirect to the additional application is employed, the correlation component 144 and/or the ML models 142 need not rely on probabilistic signals, and instead, the authentication record may be maintained on the single additional application 128 (e.g., the browser or the application associated with the authentication service provider service) and leveraged by various third-party merchant applications 128. Additionally, or alternatively, the initial enrollment process may be employed using the redirect described above, while the third-party merchant application 128 may be configured to generate, send, store, and manage the private/public key pairs.

The one or more ML model(s) 142 may be utilized by at least the correlation component 144 to determine whether two different applications 128 are on the same customer device based on one or more correlations between first probabilistic signals received from the first application and second probabilistic signals received from the second application. Additionally, or alternatively, the correlation component 144 may be configured to facilitate in delegating authentication rights from a first third-party merchant application 128 to an unassociated, second third-party merchant application 128 following the initiation of a transaction in the second third-party merchant application 128 on the buyer device 102 subsequent to the initial enrollment process.

For example, throughout any of the data exchanges between the applications 128 executing on the buyer device 128 and the authentication service provider server 104 (e.g., upon execution of an application 128), the applications 128 may transmit data indicating one or more probabilistic signals, such as, for example, global positioning system (GPS) coordinates of the buyer device 102, transaction details (e.g., a name of the customer, information associated with the payment method, etc.), time information, behavioral indications, and the like. The correlation component 144 may be configured to determine whether two applications 128 are executing on the same buyer device 102 based on these probabilistic signals, using various techniques, such as, the ML model(s) 142 and/or algorithm(s). Once this determination has been made, the correlation component 144 may send instructions to cause the buyer device 102 to generate a second private key and store the second private key in association with the second application 128. Such a determination may lead to an improved customer experience resulting in less friction to complete a payment transaction using a third-party merchant application 128. For example, a customer is no longer required to perform a 3DS authentication (e.g., redirect to an issuer website, wait for a one-time passcode, enter the passcode, redirect back to the application, etc.) with the issuer of the payment method, and instead, may simply provide a biometric input 120 to authenticate such a transaction, and the burden of authentication is placed on the correlation component 144 of the authentication service provider system rather than the customer.

Additionally, or alternatively, as previously mentioned, the correlation component 144 may be configured to facilitate in delegating authentication rights from a first third-party merchant application 128 to an unassociated, second third-party merchant application 128 following the initiation of a transaction in the second third-party merchant application 128 on the buyer device 102 subsequent to the initial enrollment process. In this subsequent transaction process, the correlation component 144 may employ any of the techniques described herein to determine a correlation between two separate third-party applications 128.

For example, a customer may login or otherwise execute a second third-party application 128 that is associated with a second merchant, and at some point, the customer may wish to execute a payment transaction within the second application 128. In some examples, the second application 128 may transmit one or more probabilistic signals, as described in more detail below, to the correlation component 144, and the correlation component 144 may send a response including instructions to generate and store in association with the second application 128, a second private key based on the probabilistic signals. In response to a request to initiate a payment transaction, the buyer device 102 and/or the application SDK 130 may query the secure database for an existing authentication record, and if found, may contact the correlation component 144 associated with the authentication delegation system requesting to authenticate the customer. Additionally, or alternatively, if an existing authentication record is not found, the 3DS authentication process between the issuer and the customer may be employed. In some examples, the request may include an indication of the device ID generated by the buyer device 102 during the enrollment. The correlation component 144 may identify, in a secure data store associated with the server, the public key of the buyer device 102 using the device ID. The correlation component 144 may then initiate a cryptographic challenge, as previously described, configured to be solved with the private key portion of the pair. As such, the customer may then provide a biometric authentication input 120 to unlock the private key portion (e.g., the second private key) and send a response to the cryptographic challenge, indicating that the buyer device 102 is still in possession of the customer and/or that the authentication record is still valid. It should be noted that an invalidation of the authentication record by the issuer may be represented in the response to the cryptographic challenge in that, while the buyer device 102 is still in possession of the customer, the authentication record is no longer valid.

The second application 128 may then send transaction details to the correlation component 144 of the authentication service provider system, either in a subsequent data exchange or with the response to the cryptographic challenge. At this point, the correlation component 144 and/or the payment processing component 152 may sign the transaction details with a private key of the authentication service provider system, indicating that the device is still in possession of the customer and the authentication record remains valid. The correlation component 144 and/or the payment processing component 152 of the authentication service provider system may then send the signed transaction details over a network to the issuer associated with the payment method. It should be noted that the signed transaction details may be received by the issuer and considered as an equal level of authentication as if the issuer had performed the 3DS authentication with the customer as described with respect to the enrollment process.

As previously mentioned, the private/public key pair generated by the buyer device 102 may be associated with the first application 128, as the key pair was generated in response to the initiated transaction in the first application 128. The private key portion may be configured to be shared between the first application 128, the second application 128, and any other application on the customer device having the SDK 130. In some examples, the correlation component 144 may be configured to determine that the applications 128 are on the same buyer device 102. Additionally, or alternatively, the management (e.g., the storage and/or access) to the private key portion may be handled by an additional application 128, such as, for example, an application associated with the authentication service provider system and/or a browser application, as previously described.

The embodiments described herein use analytical models and probabilistic signals to correlate events that are happening between a first application and second application. An authentication record generated during SDK execution in the first application may then be shared to a second application, such that a customer's payment made using the second application need not go through an initial enrollment authentication process, leading to less friction during a payment experience. Buyer device 102 and application specific private/public key pairs are integrated into the process to share the payment authentication via network communications in a secure manner. Additionally, a code may be generated based on a pre-authenticated cryptogram received from a server 104 of the authentication service provider and stored locally on a buyer device 102. The code is then scanned at a POS system which requires logic to extract and forward an authentication value included in the code to the authentication server. The authentication SDK 130 is integrated into the applications 128 and/or a buyer device 102 and a merchant device 106 in a way that secures private network communications, while avoiding technical disadvantages to prior art systems with regard to multi-factor authentication, offline authentication, and security constraints.

Figure 2A:
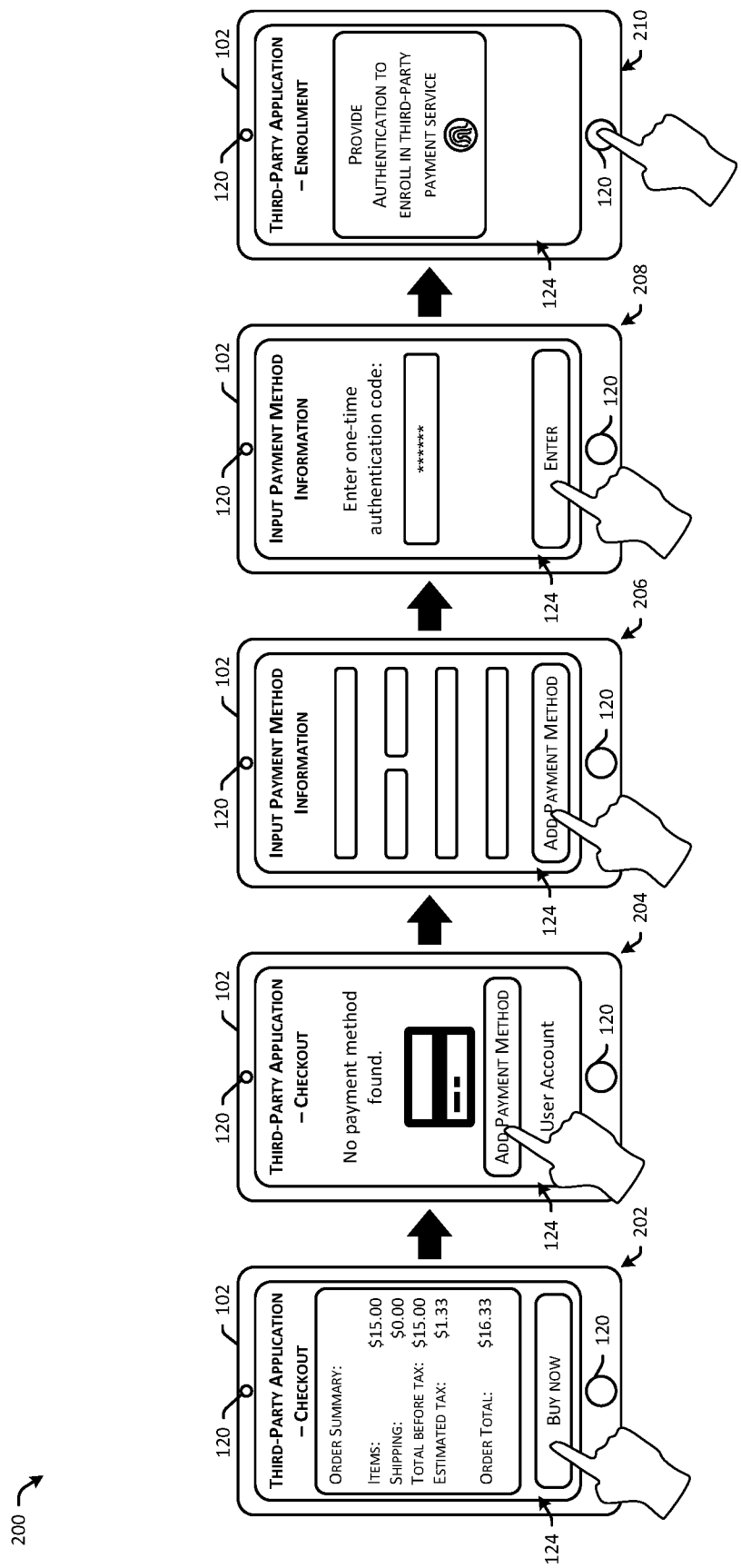
FIG. 2A illustrates an example flow of a user interacting with a user device to enroll in the authentication service provider system.

FIG. 2A illustrates an example flow for an enrollment process 200 including a user interacting with a user device 102 to enroll in the authentication service provider system. The user device 102 may include one or more biometric components 120 and/or may display one or more user interface(s) 124. In some examples, while not depicted, the user device 102 may comprise any of the components of the buyer device 102 as described with respect to FIG. 1.

At 202, a user may interact with a user interface 124 of the user device 102 to initiate a payment transaction in a third-party application that is executing on the user device 102.

At 204, the user may be presented a user interface 124 indicating that there are no payment methods that have been registered with the third-party application.

At 206, the user may be presented a user interface 124 configured to receive user input providing information to register a payment method in association with the user account associated with the authentication service provider. Following the user input to complete adding the payment method, the issuer may require that the user perform a 3DS authentication, such as, for example, sending a one-time passcode to the user by any messaging means that is unassociated with the application, such as, for example, a SMS message.

At 208, the user may be presented a user interface 124 to input the one-time code and complete the 3DS authentication requested by the issuer. Once the user inputs the one-time code, the payment method may be successfully registered in association with the user account associated with the authentication service provider.

At 210, the user may be presented a user interface 124 prompting the user to provide a biometric authentication, via the one or more biometric component(s) 120, required to enroll the user in the delegated authentication service offered by the authentication service provider. At this point, the authentication rights may be delegated from the issuer to the third-party merchant application for subsequent transactions.

Figure 2B:
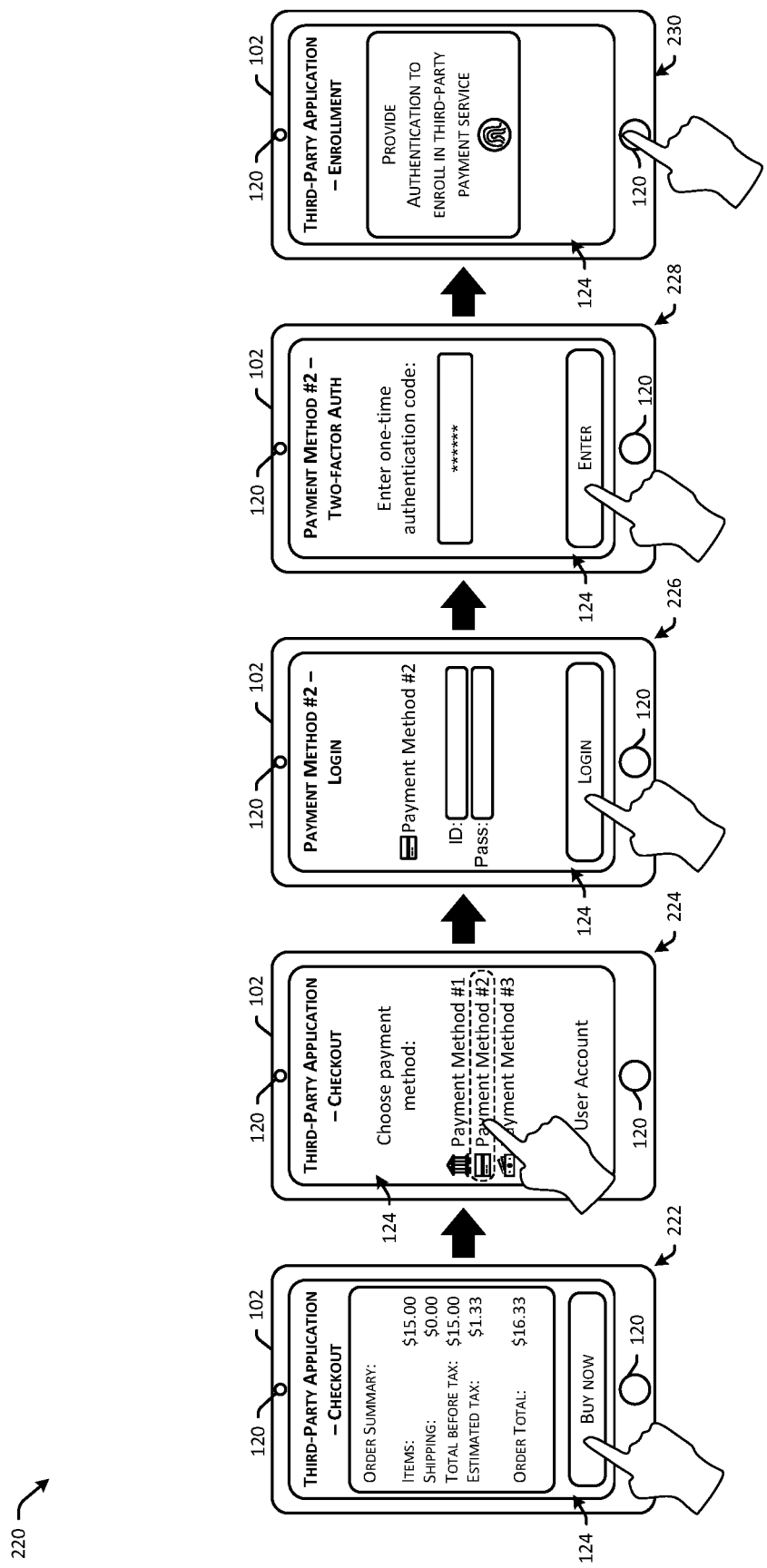
FIG. 2B illustrates another example flow of a user interacting with a user device to enroll in the authentication service provider system.

FIG. 2B illustrates another example flow for an enrollment process 220 including a user interacting with a user device 102 to enroll in the authentication service provider system. The user device 102 may include one or more biometric components 120 and/or may display one or more user interface(s) 124. In some examples, while not depicted, the user device 102 may comprise any of the components of the buyer device 102 as described with respect to FIG. 1.

At 222, a user may interact with a user interface 124 of the user device 102 to initiate a payment transaction in a third-party application that is executing on the user device 102.

At 224, the user may be presented a user interface 124 prompting the user to select from one or more payment methods that the user has registered with the third-party application to complete the payment transaction.

At 226, the user may be presented a user interface 124 presenting a browser embedded within the application and/or redirecting the user to a standalone browser application where the user may be prompted to provide account credentials associated with the payment method. The user may be prompted to provide the account credentials or otherwise login as a first form of authenticating the user to utilize the payment method. Following the user input to complete logging into the payment method account, an associated issuer may require that the user perform a 3DS authentication by sending a one-time passcode to the user by any messaging means that is unassociated with the application, such as, for example, a SMS message.

At 228, the user may be presented a user interface 124 to input the one-time code and complete the 3DS authentication requested by the issuer. Once the user inputs the one-time code, the payment method may be successfully registered in association with the user account associated with the authentication service provider.

At 230, the user may be presented a user interface 124 prompting the user to provide a biometric authentication, via the one or more biometric component(s) 120, required to enroll the user in the delegated authentication service offered by the authentication service provider. At this point, the authentication rights may be delegated from the issuer to the third-party merchant application for subsequent transactions.

Figure 3A:
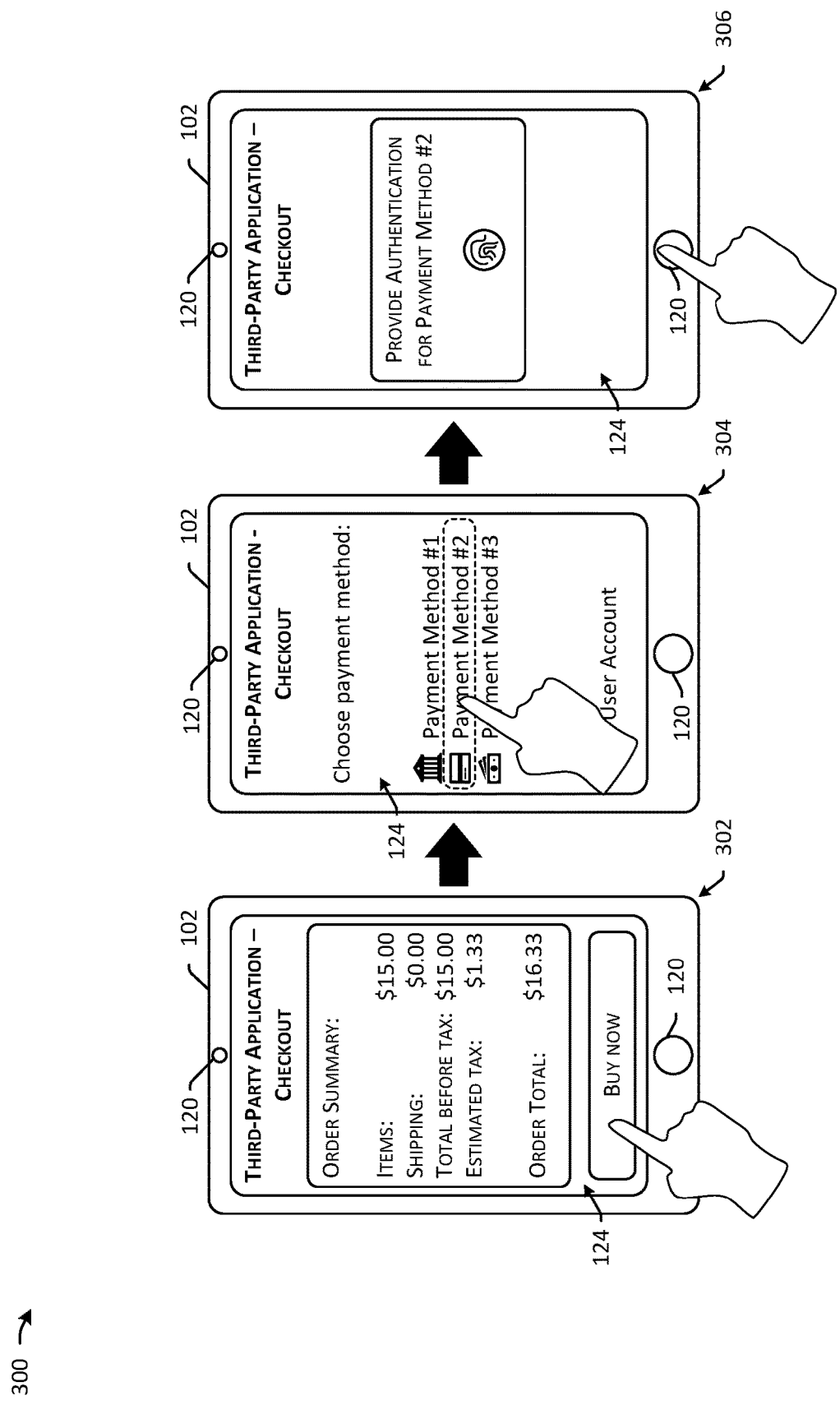
FIG. 3A illustrates an example flow of a user interacting with a user device to make a subsequent transaction with the authentication service provider system after enrollment.

FIG. 3A illustrates an example flow for a subsequent transaction process 300 including a user interacting with a user device 102 to make a subsequent transaction with the authentication service provider system after enrollment and while the device is operating in an online mode. The user device 102 may include one or more biometric components 120 and/or may display one or more user interface(s) 124. In some examples, while not depicted, the user device 102 may comprise any of the components of the buyer device 102 as described with respect to FIG. 1.

At 302, a user may interact with a user interface 124 of the user device 102 for initiating a subsequent transaction (following enrollment with the authentication service provider) in a third-party application that is executing on the user device 102.

At 304, the user may be presented a user interface 124 prompting the user to select from one or more payment methods that the user has registered with the third-party application to complete the payment transaction.

At 306, the user may be presented a user interface 124 prompting the user to provide a biometric authentication, via the one or more biometric component(s) 120, required unlock a private key, securely stored on the user device 102, required to access the existing authentication record that was generated by a prior execution of the SDK in the third-party application or another third-party application having the SDK and executing on the user device 102. The authentication records may be configured as any of the authentication records described herein. At this point, the payment transaction may be completed.

Figure 3B:
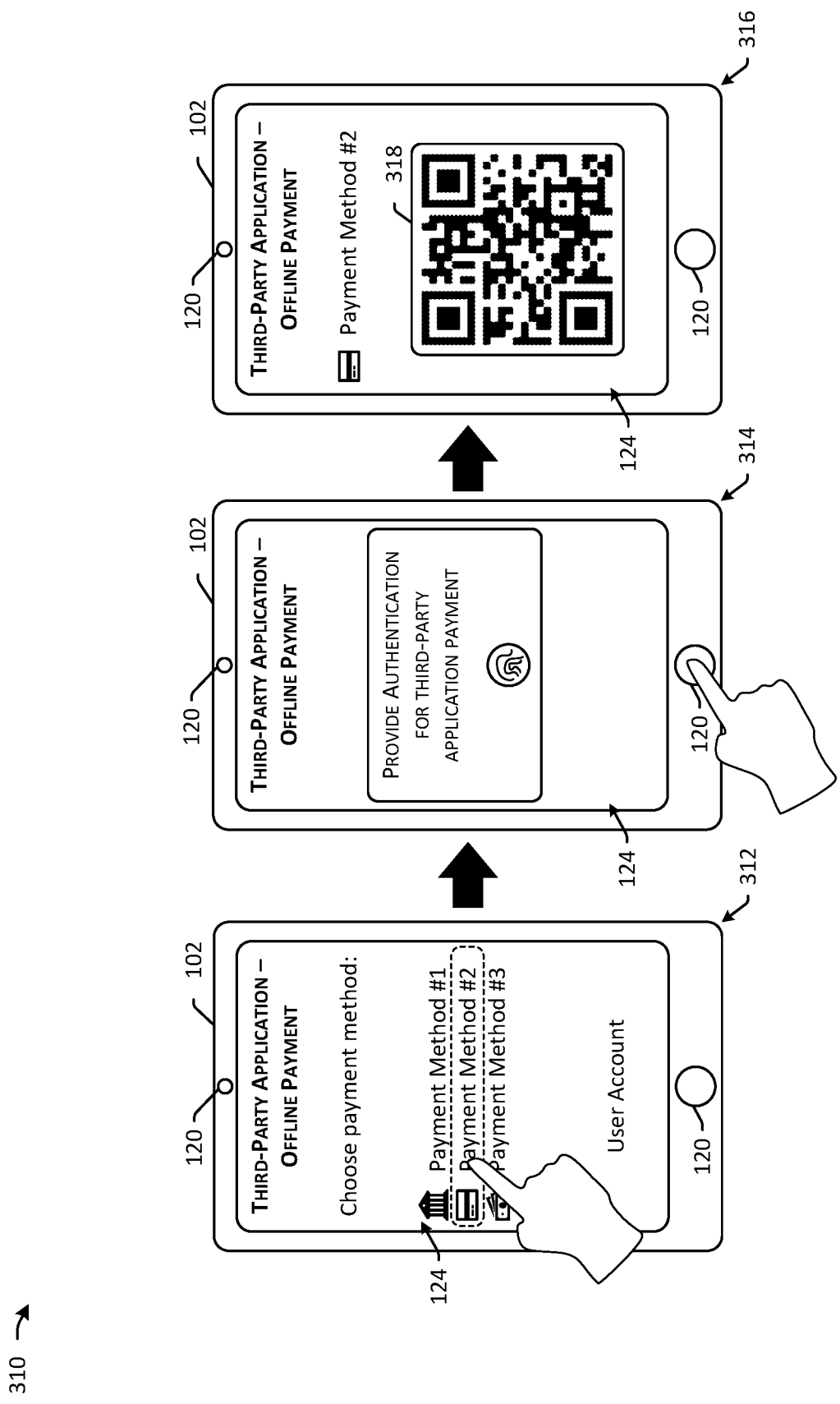
FIG. 3B illustrates another example flow of a user interacting with a user device to make a subsequent transaction with the authentication service provider system after enrollment.

FIG. 3B illustrates another example flow for a subsequent transaction process 310 including a user interacting with a user device 102 to make a subsequent transaction with the authentication service provider system after enrollment and while the device is operating in an offline mode. The user device 102 may include one or more biometric components 120 and/or may display one or more user interface(s) 124. In some examples, while not depicted, the user device 102 may comprise any of the components of the buyer device 102 as described with respect to FIG. 1.

At 312, a user may be presented a user interface 124 for conducting a subsequent transaction (following enrollment with the authentication service provider) while the device is operating in an offline mode, prompting the user to select from one or more payment methods that the user has registered with the third-party application to complete the payment transaction.

At 314, the user may be presented a user interface 124 prompting the user to provide a biometric authentication, via the one or more biometric component(s) 120, required unlock a private key, securely stored on the user device 102, required to access one or more pre-authentication record(s) that may be generated by and received from a server associated with the authentication service provider. The pre-authentication records may be configured as any of the pre-authentication records described herein.

At 316, the user may be presented a user interface 124 presenting a QR code for conducting an offline payment transaction using the user device 102, where the user device 102 may be configured as a standalone payment method. In some examples, the QR code may include the pre-authentication record accessed at 314 following the biometric input.

FIGS. 4-12 illustrate processes for enrolling in the authentication delegation platform, conducting transactions using the authentication delegation platform subsequent to enrollment, and delegating authentication for offline payment methods. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3B, 13, and 14, although the processes may be implemented in a wide variety of other environments, architectures and systems.

Figure 4:
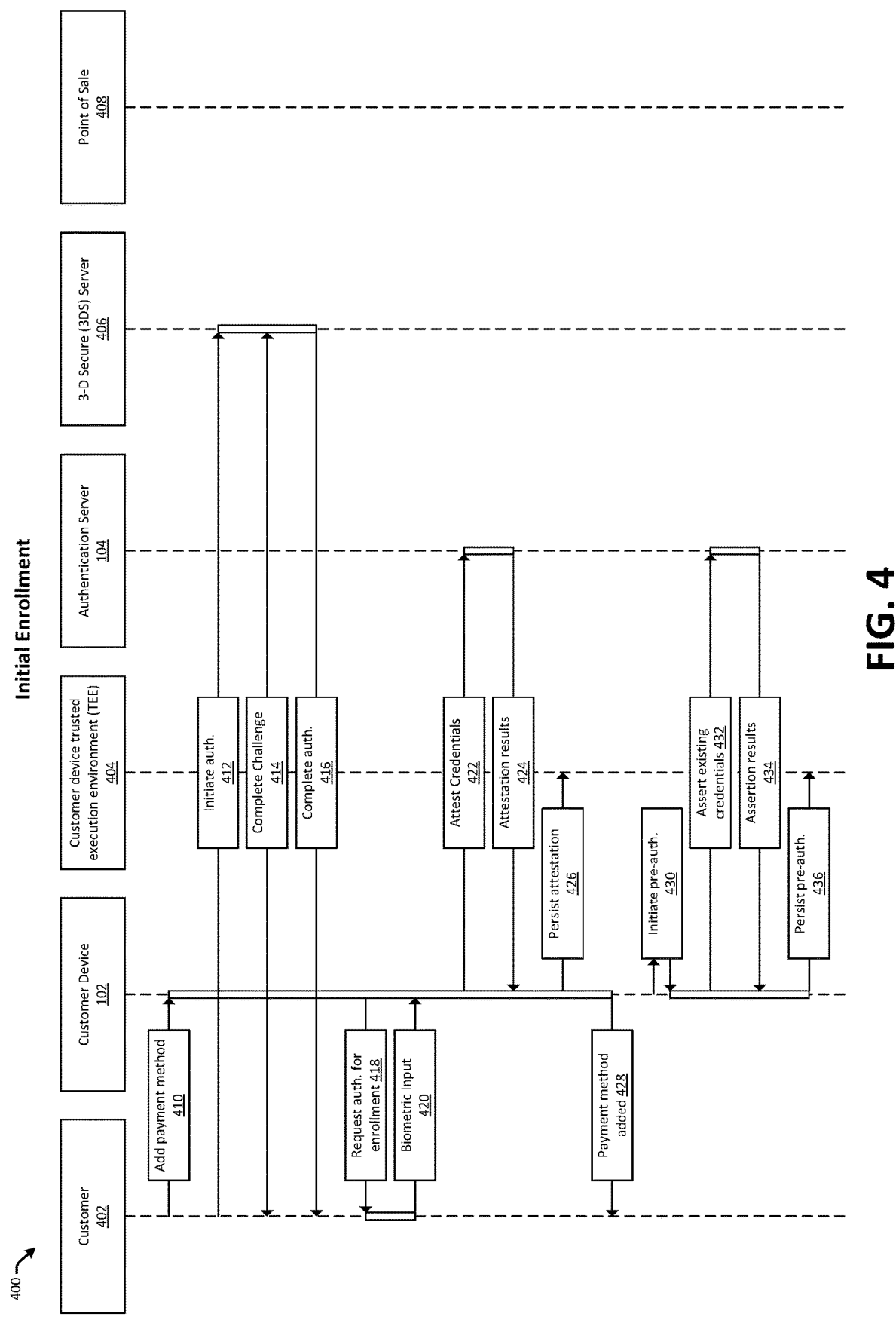
FIG. 4 illustrates a sequence diagram of an example process for enrolling in the authentication service provider system.

FIG. 4 illustrates a sequence diagram of an example process 400 for enrolling in the authentication service provider system. The order in which the operations or steps are described is not intended to be construed as a limitation, and any number of the described operations may be combined in any order and/or in parallel to implement process 400.

As previously mentioned, to leverage the lower friction delegated authentication processes described herein, a customer 402 must first enroll with the authentication service provider system. In some examples, the enrollment may be based on an initial authentication of a customer and/or a payment method associated with the customer. For example, a customer may launch a first third-party application associated with a first merchant and comprising the service provider SDK. At 410, the customer 402 may be prompted to add a payment method to a third-party application executing on the customer device 102. At 412, the application may initiate an authentication with the issuer of the payment method. At 414, the customer 402 may be prompted to perform a 3DS authentication (or any other form of authentication) to prove that they are in possession of the customer device executing the application in which the transaction is taking place (or the payment method is being registered). Such a 3DS authentication may include sending a one-time code the customer device via a data exchange means unassociated with the first application (e.g., a short message service (SMS) message) where the customer may be prompted to enter the one-time code in the first application and/or a redirection within the first application, and/or a redirection to an additional application. At 416, the authentication may be completed. At 418, the SDK and/or the application executing on the customer device 102 may request biometric authentication for enrollment. At 420, the user may provide biometric input to the user device 102 to complete enrollment with the authentication service provider.

Once the authentication is complete, the issuer may transmit the authentication record (e.g., a cryptogram) to the customer device 102 and/or the application. The customer device 102 may then generate a private/public key pair. Additionally, or alternatively, the device may generate a device identifier (ID) corresponding to the device and/or the first application in which the SDK is executing. In some examples, the customer device 102 may attach, or otherwise, store the private key portion of the pair in association with the authentication record in a trusted execution environment of the customer device. In some examples, the private key and/or authentication record may be locked, or otherwise, inaccessible unless a customer provides proper authentication. In some examples, following an authentication by the customer, the private key may be accessed and used to encrypt the authentication record prior to transmission over a network. At 422, the customer device 102 may send the public key portion of the pair to the a backend server of the authentication service provider system, where the public key is stored and may be leveraged to confirm that the customer device is still in the possession of the customer and/or to confirm that the authentication record remains valid. Additionally, or alternatively, the customer device may send the device ID to the backend server of the authentication service provider system, where the device ID may be leveraged to identify the customer device and/or the first application.

At 424, the authentication server 104 has effectively delegated the authentication rights from the issuer to the merchant application executing on the customer device 102. At 426, the customer device may respond to any cryptographic challenges received from the authentication server 104 by utilizing the private key portion to access an authentication record associated with the payment method and stored in the customer device trusted execution environment (TEE) 404.

Additionally, or alternatively, the customer 402 may enroll in the pre-authentication service offered by the authentication service provider. At 430, the user device may initiate a pre-authentication workflow, requesting one or more pre-authentication records configured to authenticate future transactions. At 432, the customer device 102 may send the existing authentication record, generated during the enrollment process, to the authentication server 104. At 434, the authentication server 104 may provide one or more pre-authentication records, configured as any of the pre-authentication records described herein. At 436, the customer device 102 may generate one or more codes for conducting offline payment transactions using the one or more pre-authentication records stored in the customer device TEE 404.

Figure 5:
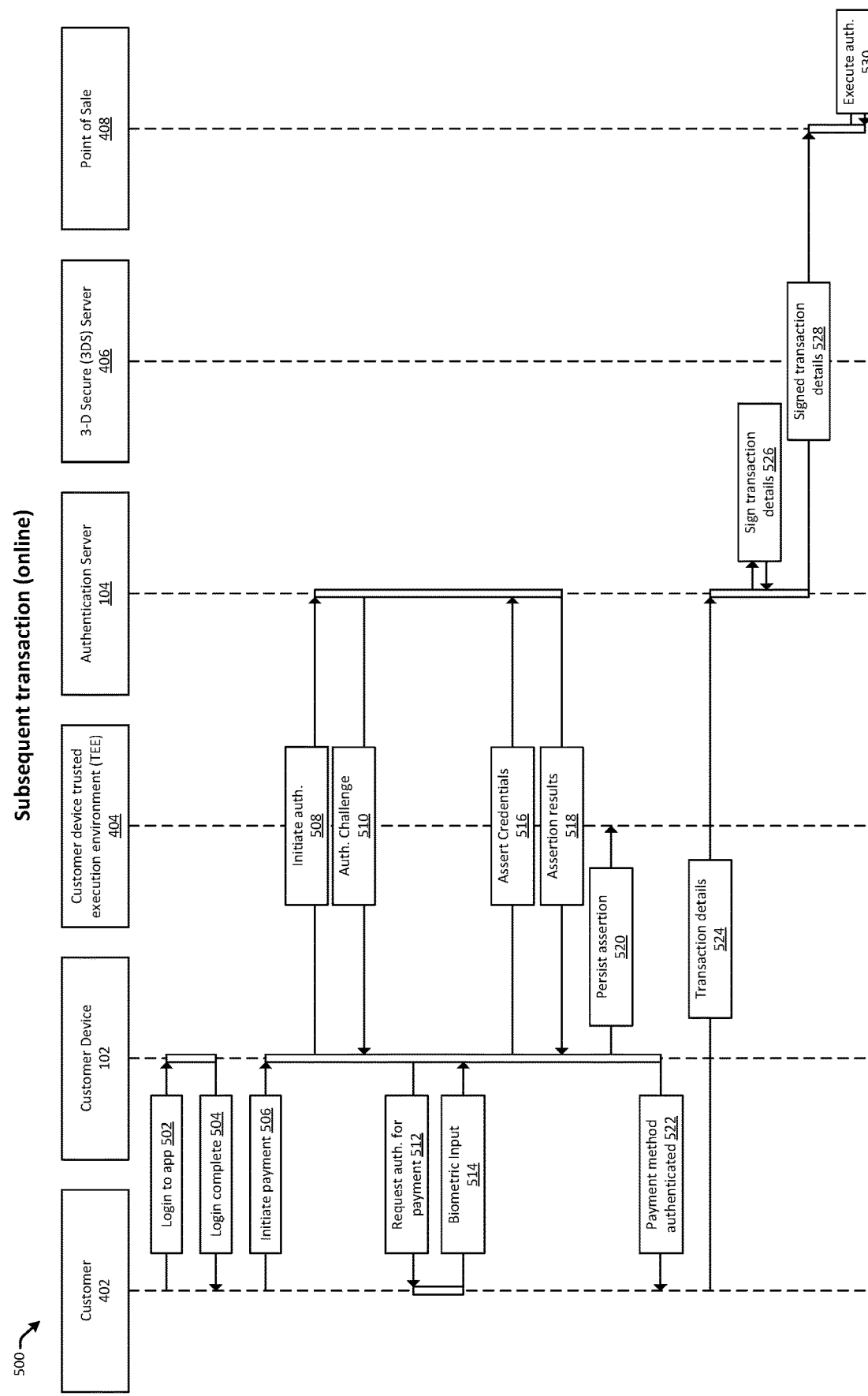
FIG. 5 illustrates a sequence diagram of an example process for making a subsequent transaction using the authentication service provider system while a mobile device is online.

FIG. 5 illustrates a sequence diagram of an example process 500 for making a subsequent transaction using the authentication service provider system while a mobile device is online. The order in which the operations or steps are described is not intended to be construed as a limitation, and any number of the described operations may be combined in any order and/or in parallel to implement process 500.

Once a customer 402 has enrolled with the authentication service provider system, the customer may leverage the lower friction delegated authentication process(es) previously described while utilizing a separate third-party application having the integrated SDK.

At 502, a customer 402 may login or otherwise execute a second third-party application that is associated with a second merchant. At 504, the customer 402 may complete the login, by providing account credentials, biometric authentication, and/or the like. At 506, the customer may wish to execute a payment transaction within the second application. At 508, the authentication server may send a cryptogram. At 508, the customer device 402 and/or the application SDK may query the secure database for an existing authentication record, and if found, may contact the authentication server 104 associated with the authentication delegation system requesting to authenticate the customer 402. In some examples, the request may include an indication of the device ID generated by the customer device during the enrollment. At 510, the authentication server 104 may identify, in a secure data store associated with the server, the public key of the device 102 using the device ID. The authentication server 104 may then initiate a cryptographic challenge, as previously described, configured to be solved with the private key portion of the pair.

At 512, the customer 402 may be prompted to provide biometric input to the customer device 102 to unlock the private key portion of the pair. At 514, the customer may then provide a biometric authentication input to unlock the private key portion (e.g., the second private key). At 516, the customer device 102 send a response to the cryptographic challenge, indicating that the device 102 is still in possession of the customer and/or that the authentication record is still valid. At 518, the authentication server may send an indication to the customer device 102 that the authentication is successful. Additionally, or alternatively, at 520, the customer device may persist the authentication record in the TEE 404 of the customer device 102. At 522, the payment method has been authenticated.

At 524, the second application may then send transaction details to the authentication server 104 of the authentication service provider system, either in a subsequent data exchange or with the response to the cryptographic challenge. At 526, the authentication server 104 may sign the transaction details with a private key of the authentication server 104, indicating that the device is still in possession of the customer and the authentication record remains valid. At 528, the authentication server 104 of the authentication service provider system may then send the signed transaction details over a network to the issuer (e.g., a point of sale 408) associated with the payment method. At 530, the authentication may be executed at the point of sale 408.

Figure 6:
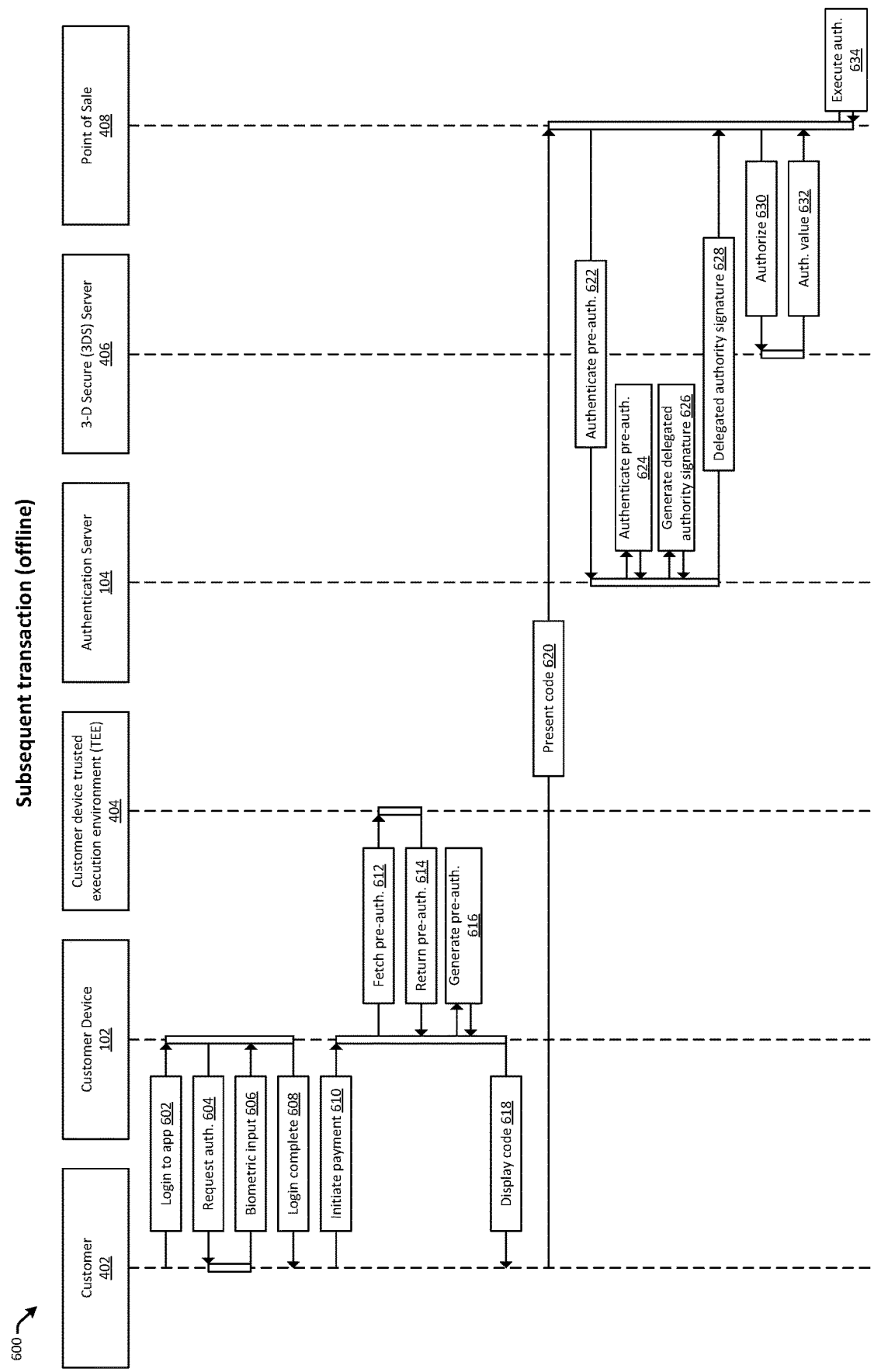
FIG. 6 illustrates a sequence diagram of an example process for making a subsequent transaction using the authentication service provider system while a mobile device is offline.

FIG. 6 illustrates a sequence diagram of an example process 600 for making a subsequent transaction using the authentication service provider system while a mobile device is offline. The order in which the operations or steps are described is not intended to be construed as a limitation, and any number of the described operations may be combined in any order and/or in parallel to implement process 600.

The SDK may further include a pre-authentication process, such that a customer device 102, operating in an "offline" mode (e.g., without access to an internet connection) may be configured as a valid standalone payment instrument. In some examples, during the enrollment process 400, as described with respect to FIG. 4, the customer may have an option to enable subsequent offline purchases (e.g., at 430). For example, the customer device may also store, in the same datastore as the existing authentication record and/or in a separate secure datastore, one or more pre-authentication records generated by the authentication server of the authentication service provider system using the authentication record(s).

At 602, the customer 402 may login to the third-party application. At 604, the customer device 102 may request authentication from the customer 402 to login to the application. In some examples, the requested authentication may be configured as a prompt for a user 402 to provide a biometric input. At 606, the customer 402 may provide the biometric input required to login to the application. At 608, the login may be completed.

At 610, the customer 402 may initiate an offline payment using a payment method having one or more pre-authentication records. At 612, the customer device 102 may fetch one or more of the pre-authentication records from the TEE 404 of the customer device 102. At 614, one or more of the pre-authentication records may be returned from the TEE 404 to the customer device 102 and/or the application. Additionally, or alternatively, depending on a configuration of the pre-authentication records, at 616, the device 102 may utilize the private key and/or the pre-authentication record to execute one or more functions configured to generate the one-time passcode. Additionally, or alternatively, at 616, the device 102 may generate a pre-authentication code. At 618, the code may be presented on a display of the customer device 102.

At 620, the customer 402 may present the code to a point of sale device 408. In some examples, the POS device may scan the code or otherwise receive the code from the customer device 102. At 622, the POS device may authenticate the pre-authentication code. In some examples, the POS device may send the pre-authentication code to the authentication server 104. At 624, upon receiving the pre-authentication code, the authentication server may authenticate the pre-authentication code using the public key portion of the pair. Additionally, or alternatively, depending on a configuration of the pre-authentication records, at 624, the authentication server may utilize the public key and/or the pre-authentication code to execute one or more functions configured to generate the one-time passcode. Additionally, or alternatively, at 624, the authentication server 104 may call the 3-D secure (3DS) server 406 to fetch a 3DS cryptogram, and the authentication server 104 may send the 3DS cryptogram back to the POS 408, responsive to receiving the pre-authentication code. At 626, the authentication server 104 may generate a delegated authentication signature and sign the pre-authentication record with the signature. At 628, the authentication server 104 may return the delegated authority signature to the point of sale 408. At 630, the point of sale device 408 may authorize the delegated authority signature with the 3DS server. At 632, the 3DS server may then return an authorization value to the point of sale device 408. At 634, the authorization may be executed at the point of sale 408.

Figure 7:
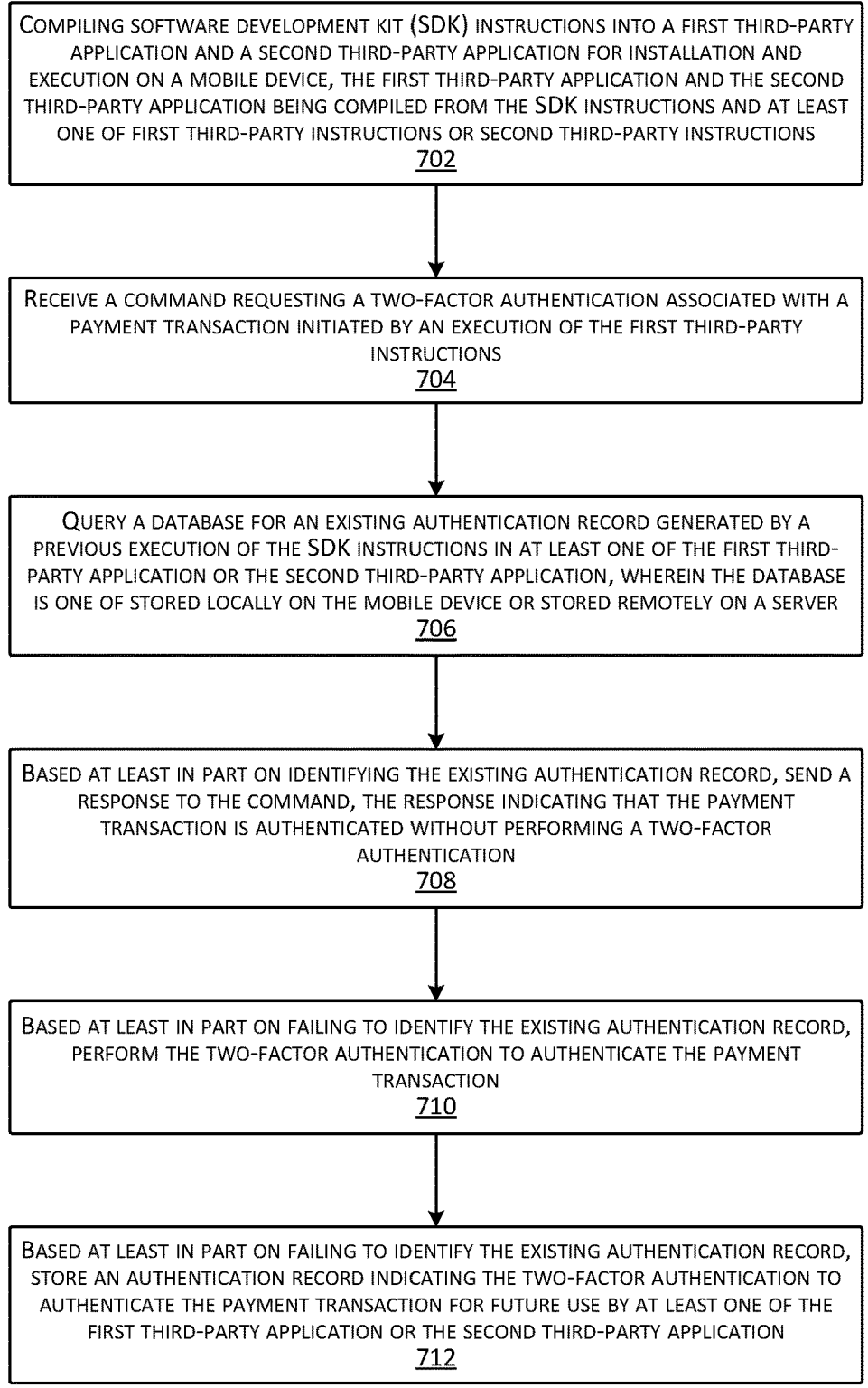
FIG. 7 illustrates an example process for utilizing an existing authentication record to authenticate a payment transaction and performing a two-factor authentication and storing an associated authentication record when an existing authentication record does not exist.

FIG. 7 illustrates an example process 700 for utilizing an existing authentication record to authenticate a payment transaction and performing a two-factor authentication and storing an associated authentication record when an existing authentication record does not exist. The order in which the operations or steps are described is not intended to be construed as a limitation, and any number of the described operations may be combined in any order and/or in parallel to implement process 700.

At block 702, the process 700 may include compiling software development kit (SDK) instructions into a first third-party application and/or a second third-party application for installation and execution as compiled SDK instructions on a mobile device. In some examples, the first third-party application and/or the second third-party application being compiled from the SDK instructions and at least one of first third-party instructions or second third-party instructions. In some examples, the additional steps in the process may be performed by the compiled SDK instructions executing in at least one of the first third party application and/or the second third-party application. In some examples, the SDK may correspond to the SDK 130 as described with respect to FIG. 1.

At block 704, the process 700 may include receiving a command requesting a two-factor authentication associated with a payment transaction initiated by an execution of the first third-party instructions.

At block 706, the process 700 may include querying a database for an existing authentication record generated by a previous execution of the compiled SDK instructions in at least one of the first third-party application and/or the second third-party application. In some examples, the database is stored locally on the mobile device. Additionally, or alternatively, the database is stored remotely on a server.

At block 708, the process 700 may include sending a response to the command. In some examples, the response may indicate that the payment transaction is authenticated without performing a two-factor authentication. Additionally, or alternatively, sending the response may be based at least in part on identifying the existing authentication record.

At block 710, the process 700 may include performing the two-factor authentication to authenticate the payment transaction. In some examples, performing the two-factor authentication may be based at least in part on failing to identify the existing authentication record.

At block 712, the process 700 may include storing an authentication record indicating the two-factor authentication to authenticate the payment transaction for future use by at least one of the first third-party application and/or the second third-party application. In some examples, storing the authentication record may be based at least in part on failing to identify the existing authentication record. Additionally, or alternatively, storing the authentication record may be based at least in part on performing the two-factor authentication.

In some examples, the existing authentication record may be generated by the previous execution of the compiled SDK instructions in the second third-party application. Additionally, or alternatively, the existing authentication record may be associated with a key. Additionally, or alternatively, the process 700 may include Additionally, or alternatively, the process 700 may include receiving a cryptographic challenge requesting a verification that the mobile device has access to the key. Additionally, or alternatively, the process 700 may include presenting a request for authentication input from a user of the mobile device. In some examples, the authentication input may include a biometric input, such as, for example, a face scan and/or a fingerprint scan. Additionally, or alternatively, the process 700 may include sending a response to the cryptographic challenge indicating that the mobile device has access to the key. Additionally, or alternatively, sending the response may be based at least in part on receiving the authentication input from the user of the mobile device. Additionally, or alternatively, the process 700 may include identifying the existing authentication record based at least in part on sending the response to the cryptographic challenge.

In some examples, the existing authentication record may be generated by the previous execution of the compiled SDK instructions in the second third-party application. Additionally, or alternatively, the existing authentication record may be associated with a first key. Additionally, or alternatively, the process 700 may include generating a second key associated with the existing authentication record. In some examples, generating the second key may be based at least in part on probabilistic signals associated with the mobile device. Additionally, or alternatively, the probabilistic signals may indicate a correlation between the first third-party application and the second third-party application. Additionally, or alternatively, the second key may be associated with the first third-party application. In some examples, identifying the existing authentication record may be based at least in part on the second key.

Additionally, or alternatively, the process 700 may include redirecting to the second third-party application to perform the two-factor authentication to authenticate the payment transaction. In some examples, storing the authentication record may comprise storing the authentication record locally on the mobile device in association with the first third-party application. Additionally, or alternatively, storing the authentication record may comprise storing the authentication record locally on the mobile device in association with the second third-party application. Additionally, or alternatively, storing the authentication record may comprise storing the authentication record remotely on the server in association with the second third-party application.

In some examples, the previous execution of the compiled SDK instructions in the second third-party application may comprise sending first probabilistic signals associated with the second third-party application to the server. Additionally, or alternatively, the process 700 may include sending second probabilistic signals associated with the first third-party application to the server. Additionally, or alternatively, the process 700 may include receiving an indication that the first third-party application and the second third-party application are associated with the mobile device. Additionally, or alternatively, the process 700 may include identifying the existing authentication record based at least in part on the indication.

Figure 8:
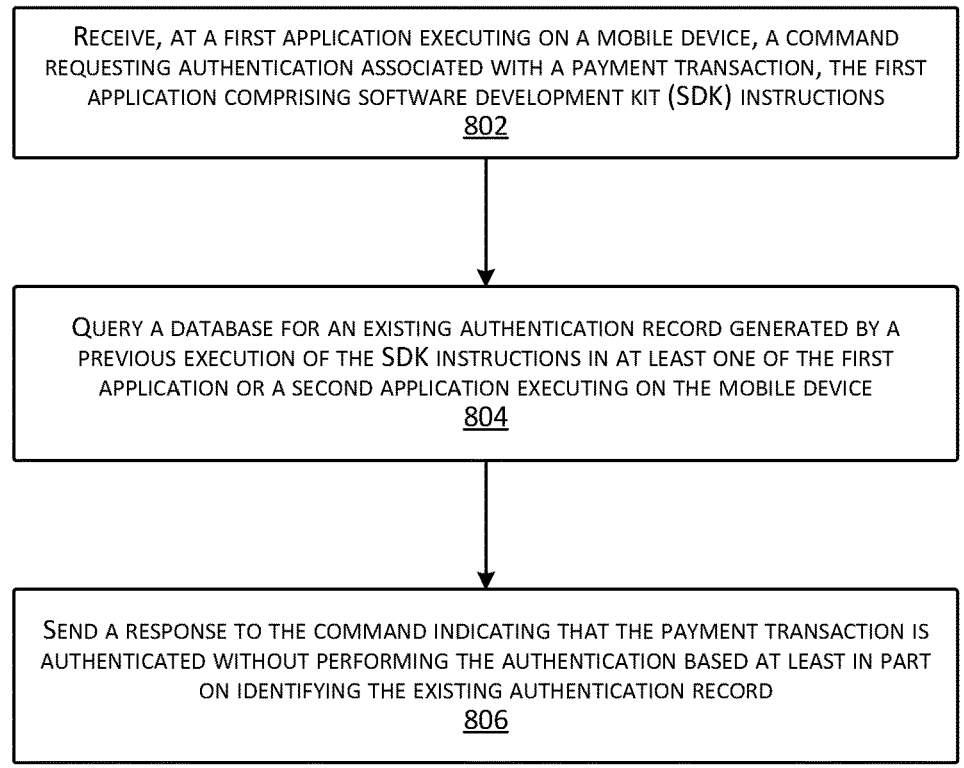
FIG. 8 illustrates an example process for utilizing an existing authentication record to authenticate a payment transaction.

FIG. 8 illustrates an example process 800 for utilizing an existing authentication record to authenticate a payment transaction. The order in which the operations or steps are described is not intended to be construed as a limitation, and any number of the described operations may be combined in any order and/or in parallel to implement process 800.

At block 802, the process 800 may include receiving, at a first application executing on a mobile device, a command requesting authentication associated with a payment transaction. In some examples, the first application may comprise software development kit (SDK) instructions. In some examples, the SDK may correspond to the SDK 130 as described with respect to FIG. 1.

At block 804, the process 800 may include querying a database for an existing authentication record generated by a previous execution of the SDK instructions in at least one of the first application and/or a second application executing on the mobile device.

At block 806, the process 800 may include sending a response to the command indicating that the payment transaction is authenticated without performing the authentication. In some examples, sending the response may be based at least in part on identifying the existing authentication record.

Additionally, or alternatively, the process 800 may include performing the authentication to authenticate the payment transaction. In some examples, performing the authentication may be based at least in part on failing to identify the existing authentication record. Additionally, or alternatively, the process 800 may include storing an authentication record indicating the authentication to authenticate a future payment transaction by at least one of the first application and/or the second application. In some examples, storing the authentication record may be based at least in part on failing to identify the existing authentication record. Additionally, or alternatively, storing the authentication record may be based at least in part on performing the authentication.

Additionally, or alternatively, the process 800 may include causing the application to redirect to the second application to perform the authentication to authenticate the payment transaction. In some examples, storing the authentication record may comprise storing the authentication record locally on the mobile device in association with the first third-party application. Additionally, or alternatively, storing the authentication record may comprise storing the authentication record locally on the mobile device in association with the second third-party application. Additionally, or alternatively, storing the authentication record may comprise storing the authentication record remotely on the server in association with the second third-party application.

In some examples, the authentication record may be encrypted as an encrypted authentication record. Additionally, or alternatively, encrypting the authentication record may be based at least in part on a key. Additionally, or alternatively, the process 800 may include presenting a request for authentication input from a user of the mobile device. Additionally, or alternatively, the process 800 may include granting access to the key. In some examples, the authentication input may include a biometric input, such as, for example, a face scan and/or a fingerprint scan. In some examples, granting access to the key may be based at least in part on receiving the authentication input from the user of the mobile device. Additionally, or alternatively, the process 800 may include decrypting, based at least in part on the key, the encrypted authentication record to generate a decrypted authentication record. Additionally, or alternatively, the process 800 may include sending the response to the command based at least in part on the decrypted authentication record.

In some examples, the existing authentication record may be generated by the previous execution of the SDK instructions in the second application and/or may be associated with a first key. Additionally, or alternatively, the process 800 may include generating a second key associated with the existing authentication record. In some examples, generating the second key may be based at least in part on probabilistic signals associated with the mobile device. Additionally, or alternatively, the probabilistic signals may indicate a correlation between the first application and the second application. Additionally, or alternatively, the second key may be associated with the first application. Additionally, or alternatively, the process 800 may include identifying the existing authentication record based at least in part on the second key In some examples, the previous execution of the SDK instructions in the second application may comprise sending first probabilistic signals associated with the second application to a server. Additionally, or alternatively, the process 800 may include sending second probabilistic signals associated with the first application to the server. Additionally, or alternatively, the process 800 may include receiving, from the server, an indication that the first application and the second application are associated with the mobile device. Additionally, or alternatively, the process 800 may include identifying the existing authentication record based at least in part on the indication.

In some examples, the database is stored remotely on a server and/or the existing authentication record is associated with a key. Additionally, or alternatively, the process 800 may include receiving a cryptographic challenge requesting a verification that the mobile device has access to the key. Additionally, or alternatively, the process 800 may include presenting a request for authentication input from a user of the mobile device. In some examples, the authentication input may include a biometric input, such as, for example, a face scan and/or a fingerprint scan. Additionally, or alternatively, the process 800 may include sending a response to the cryptographic challenge indicating that the mobile device has access to the key. In some examples, sending the response may be based at least in part on receiving the authentication input from the user of the mobile device. Additionally, or alternatively, the process 800 may include identifying the existing authentication record based at least in part on sending the response to the cryptographic challenge.

In some examples, the database is one of stored locally on the mobile device or stored remotely on a server associated with a software developer of the SDK.

Figure 9:
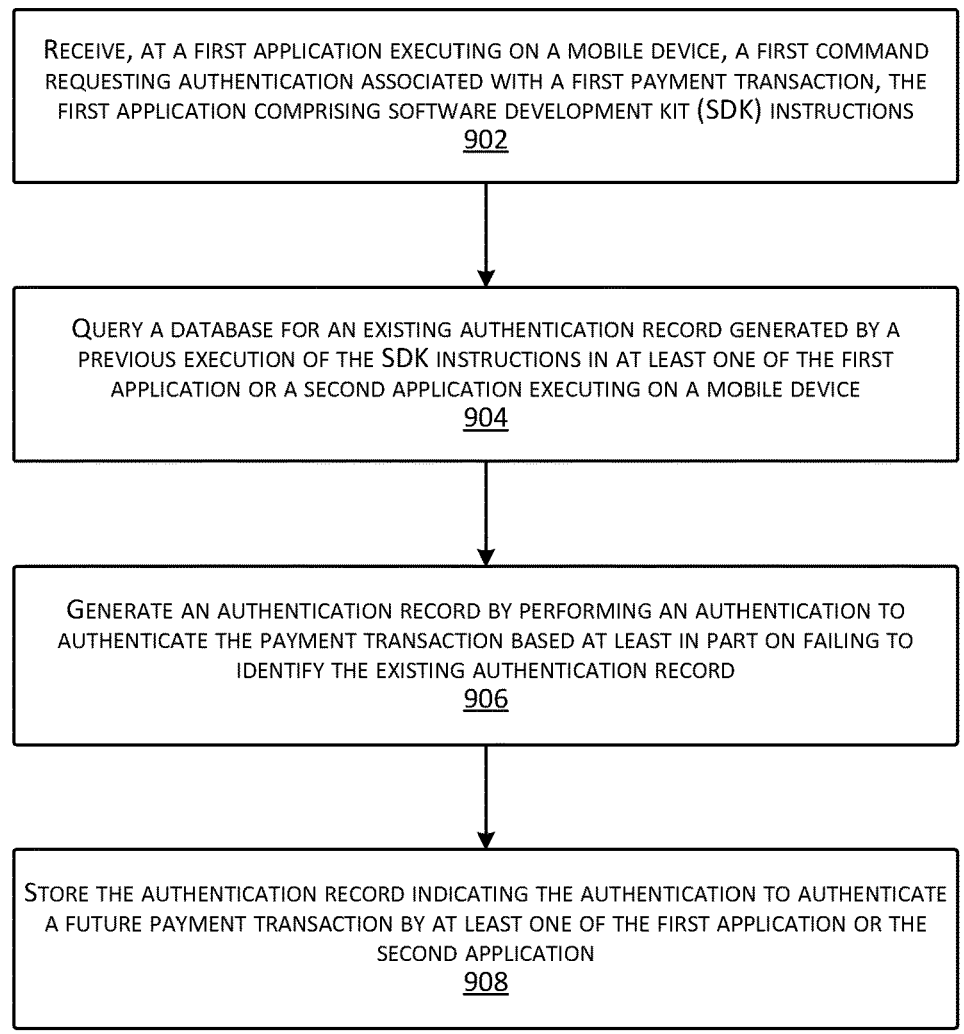
FIG. 9 illustrates an example process for performing a two-factor authentication and storing an associated authentication record to authenticate a future payment transaction when an existing authentication record does not exist.

FIG. 9 illustrates an example process 900 for performing a two-factor authentication and storing an associated authentication record to authenticate a future payment transaction when an existing authentication record does not exist. The order in which the operations or steps are described is not intended to be construed as a limitation, and any number of the described operations may be combined in any order and/or in parallel to implement process 900.

At block 902, the process 900 may include receiving, at a first application executing on a mobile device, a first command requesting authentication associated with a first payment transaction. In some examples, the first application may comprise software development kit (SDK) instructions. In some examples, the SDK may correspond to the SDK 130 as described with respect to FIG. 1.

At block 904, the process 900 may include querying a database for an existing authentication record generated by a previous execution of the SDK instructions in at least one of the first application and/or a second application executing on the mobile device.

At block 906, the process 900 may include generating an authentication record by performing an authentication to authenticate the payment transaction. In some examples, generating the authentication record may be based at least in part on failing to identify the existing authentication record.

At block 908, the process 900 may include storing the authentication record indicating the authentication to authenticate a future payment transaction by at least one of the first application or the second application. In some examples, storing the authentication record may be based at least in part on failing to identify the existing authentication record.

Additionally, or alternatively, the process 900 may include receiving, at the second application, a second command requesting authentication associated with a second payment transaction initiated. In some examples, the second application may comprise the SDK instructions. Additionally, or alternatively, the process 900 may include querying, by the second application, the database for the authentication record indicating the authentication to authenticate the future payment transaction. Additionally, or alternatively, the process 900 may include sending a response to the second command. In some examples, the response may indicate that the payment transaction is authenticated without performing the authentication. Additionally, or alternatively, sending the response may be based at least in part on identifying the authentication record.

In some examples, the existing authentication record may be generated by the previous execution of the SDK instructions in the second application and/or may be associated with a first key. Additionally, or alternatively, the process 900 may include generating a second key associated with the existing authentication record. In some examples, the probabilistic signals may indicate a correlation between the first application and the second application. Additionally, or alternatively, the second key may be associated with the first application. Additionally, or alternatively, generating the second key may be based at least in part on probabilistic signals associated with the mobile device. Additionally, or alternatively, the process 900 may include identifying the existing authentication record based at least in part on the second key.

In some examples, the previous execution of the SDK instructions in the second application comprises sending first probabilistic signals associated with the second application to a server. Additionally, or alternatively, the process 900 may include sending second probabilistic signals associated with the first application to the server. Additionally, or alternatively, the process 900 may include receiving, from the server, an indication that the first application and the second application are associated with the mobile device. Additionally, or alternatively, the process 900 may include identifying the existing authentication record based at least in part on the indication.

Additionally, or alternatively, the process 900 may include causing the first application to redirect to the second application to perform the authentication to authenticate the payment transaction. In some examples, storing the authentication record may comprise storing the authentication record locally on the mobile device in association with the first application. Additionally, or alternatively, storing the authentication record may comprise storing the authentication record locally on the mobile device in association with the second application. Additionally, or alternatively, storing the authentication record may comprise storing the authentication record remotely on the server in association with the second application.

In some examples, the existing authentication record may be encrypted as an encrypted existing authentication record based at least in part on a key. Additionally, or alternatively, the process 900 may include presenting a request for authentication input from a user of the mobile device. In some examples, the authentication input may include a biometric input, such as, for example, a face scan and/or a fingerprint scan. Additionally, or alternatively, the process 900 may include, based at least in part on receiving the authentication input from the user of the mobile device, granting access to the key. Additionally, or alternatively, the process 900 may include decrypting, based at least in part on the key, the encrypted existing authentication record to generate a decrypted existing authentication record. Additionally, or alternatively, the process 900 may include sending a response to the first command based at least in part on the decrypted existing authentication record.

In some examples, the database is one of stored locally on the mobile device or stored remotely on a server associated with a software developer of the SDK.

Figure 10:
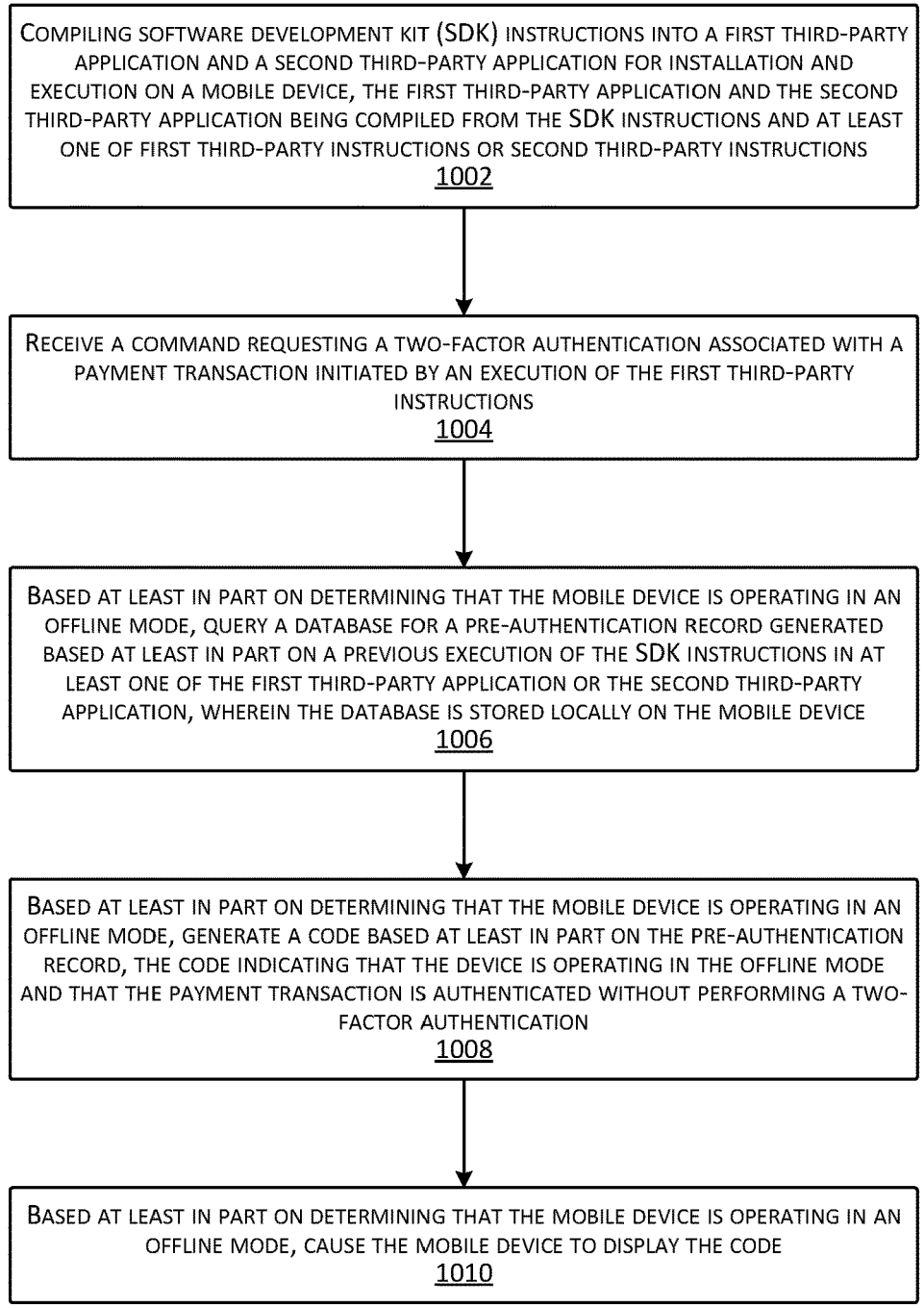
FIG. 10 illustrates an example process for authenticating a payment transaction when a mobile device is operating in an offline mode by generating a code to be displayed on a mobile device using a pre-authentication record.

FIG. 10 illustrates an example process 1000 for authenticating a payment transaction when a mobile device is operating in an offline mode by generating a code to be displayed on a mobile device using a pre-authentication record. The order in which the operations or steps are described is not intended to be construed as a limitation, and any number of the described operations may be combined in any order and/or in parallel to implement process 1000.

At block 1002, the process 1000 may include compiling software development kit (SDK) instructions into a first third-party application and a second third-party application for installation and execution as compiled SDK instructions on a mobile device. In some examples, the first third-party application and/or the second third-party application being compiled from the SDK instructions and/or at least one of first third-party instructions or second third-party instructions. In some examples, the compiled SDK instructions may be configured to cause at least one of the first third-party application and/or the second third-party application to perform any of the operations included in the process 1000. In some examples, the SDK may correspond to the SDK 130 as described with respect to FIG. 1.

At block 1004, the process 1000 may include receiving a command requesting a two-factor authentication associated with a payment transaction initiated by an execution of the first third-party instructions.

At block 1006, the process 1000 may include querying a database for a pre-authentication record generated based at least in part on a previous execution of the compiled SDK instructions in at least one of the first third-party application or the second third-party application. In some examples, the database may be stored locally on the mobile device. Additionally, or alternatively, querying the database may be based at least in part on determining that the mobile device is operating in an offline mode.

At block 1008, the process 1000 may include generating a code based at least in part on the pre-authentication record. In some examples, the code may indicate that the device is operating in the offline mode and/or that the payment transaction is authenticated without performing a two-factor authentication. Additionally, or alternatively, generating the code may be based at least in part on determining that the mobile device is operating in an offline mode.

At block 1010, the process 1000 may include causing the mobile device to display the code. Additionally, or alternatively, causing the mobile device to display the code may be based at least in part on determining that the mobile device is operating in an offline mode.

In some examples, the database may be a first database. Additionally, or alternatively, the process 1000 may include querying a second database for an existing authentication record generated by a previous execution of the compiled SDK instructions in at least one of the first third-party application or the second third-party application. In some examples, the second database is one of stored locally on the mobile device or stored remotely on a server. Additionally, or alternatively, querying the second database may be based at least in part on determining that the mobile device is operating in an online mode. Additionally, or alternatively, the process 1000 may include sending a response to the command, the response indicating that the device is operating in the online mode and that the payment transaction is authenticated without performing a two-factor authentication. Additionally, or alternatively, sending the response may be based at least in part on determining that the mobile device is operating in an online mode.

In some examples, the pre-authentication record may be a first pre-authentication record of a number of pre-authentication records, and/or individual ones of the pre-authentication records may be configured as an authentication for a single transaction.

In some examples, the pre-authentication record may be a first pre-authentication record that is associated with a key and/or may be valid for a first period of time. Additionally, or alternatively, the process 1000 may include generating a second pre-authentication record that is valid for a second period of time that is substantially similar to the first period of time. In some examples, the second-pre-authentication record may be based at least in part on the first pre-authentication record and the key. Additionally, or alternatively, generating the second pre-authentication may be based at least in part on an expiration of the first period of time. Additionally, or alternatively, the process 1000 may include storing the second pre-authentication record in the database. In some examples, storing the second pre-authentication record may comprise overwriting the first pre-authentication record.

In some examples, the pre-authentication record may be associated with at least one of an identifier of at least one of the first third-party application and/or the second third-party application, a transaction amount, information associated with a user of the mobile device, a merchant identifier, and/or information associated with a merchant.

Figure 11:
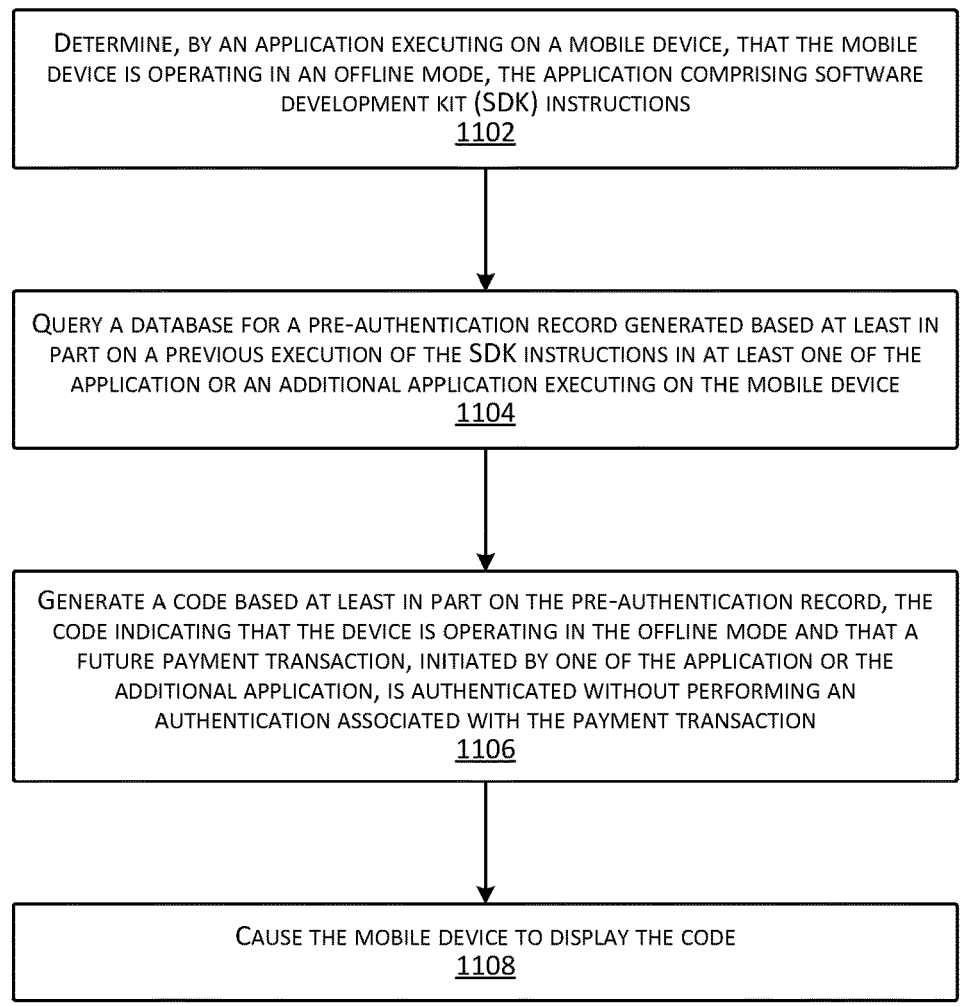
FIG. 11 illustrates another example process for authenticating a payment transaction when a mobile device is operating in an offline mode by generating a code to be displayed on a mobile device using a pre-authentication record.

FIG. 11 illustrates another example process 1100 for authenticating a payment transaction when a mobile device is operating in an offline mode by generating a code to be displayed on a mobile device using a pre-authentication record. The order in which the operations or steps are described is not intended to be construed as a limitation, and any number of the described operations may be combined in any order and/or in parallel to implement process 1100.

At block 1102, the process 1100 may include determining, by an application executing on a mobile device, that the mobile device is operating in an offline mode. In some examples, the application may comprise software development kit (SDK) instructions. In some examples, the SDK may correspond to the SDK 130 as described with respect to FIG. 1.

At block 1104, the process 1100 may include querying a database for a pre-authentication record generated based at least in part on a previous execution of the SDK instructions in at least one of the application and/or an additional application executing on the mobile device.

At block 1106, the process 1100 may include generating a code based at least in part on the pre-authentication record. In some examples, the code may indicate that the device is operating in the offline mode and/or that a future payment transaction, initiated by one of the application and/or the additional application, may be authenticated without performing an authentication associated with the payment transaction.

At block 1108, the process 1100 may include causing the mobile device to display the code.

In some examples, the database may be a first database. Additionally, or alternatively, the process 1100 may include receiving a command requesting the authentication associated with the payment transaction initiated by one of the application or the additional application. Additionally, or alternatively, the process 1100 may include determining that the mobile device is operating in an online mode. Additionally, or alternatively, the process 1100 may include querying a second database for the pre-authentication record, wherein the second database is one of stored locally on the mobile device or stored remotely on a server. Additionally, or alternatively, the process 1100 may include sending a response to the command, the response may indicate that the device is operating in the online mode and that the payment transaction is authenticated without performing the authentication.

In some examples, the pre-authentication record may be a first pre-authentication record of a number of pre-authentication records, and/or individual ones of the pre-authentication records may be configured as an authentication for a single transaction.

In some examples, the pre-authentication record is a first pre-authentication record that is associated with a key and/or is valid for a first period of time. Additionally, or alternatively, the process 1100 may include based at least in part on an expiration of the first period of time, generating a second pre-authentication record that is valid for a second period of time that is substantially similar to the first period of time.

In some examples, the second-pre-authentication record may be based at least in part on the first pre-authentication record and the key. Additionally, or alternatively, the process 1100 may include storing the second pre-authentication record in the database. In some examples, storing the second pre-authentication record may comprise overwriting the first pre-authentication record.

In some examples, the pre-authentication record may be associated with at least one of an identifier of at least one of the application or the additional application, a transaction amount, information associated with a user of the mobile device, a merchant identifier, and/or information associated with a merchant.

In some examples, the pre-authentication record is generated by the previous execution of the SDK instructions in the additional application and/or is associated with a key. Additionally, or alternatively, the process 1100 may include receiving a cryptographic challenge requesting a verification that the mobile device has access to the key. Additionally, or alternatively, the process 1100 may include presenting a request for authentication input from a user of the mobile device. In some examples, the authentication input may include a biometric input, such as, for example, a face scan and/or a fingerprint scan. Additionally, or alternatively, the process 1100 may include, based at least in part on receiving the authentication input from the user of the mobile device, sending a response to the cryptographic challenge indicating that the mobile device has access to the key. Additionally, or alternatively, the process 1100 may include querying the database for the pre-authentication record based at least in part on sending the response to the cryptographic challenge.

In some examples, the code is at least one of a Quick Response (QR) code or a Near Field Communication (NFC) code.

In some examples, the pre-authentication record is encrypted as an encrypted pre-authentication record and/or may be based at least in part on a key. Additionally, or alternatively, the process 1100 may include presenting a request for authentication input from a user of the mobile device. In some examples, the authentication input may include a biometric input, such as, for example, a face scan and/or a fingerprint scan. Additionally, or alternatively, the process 1100 may include, based at least in part on receiving the authentication input from the user of the mobile device, granting access to the key. Additionally, or alternatively, the process 1100 may include decrypting, based at least in part on the key, the encrypted pre-authentication record to generate a decrypted authentication record. Additionally, or alternatively, the process 1100 may include generating the code based at least in part on the decrypted authentication record.

Figure 12:
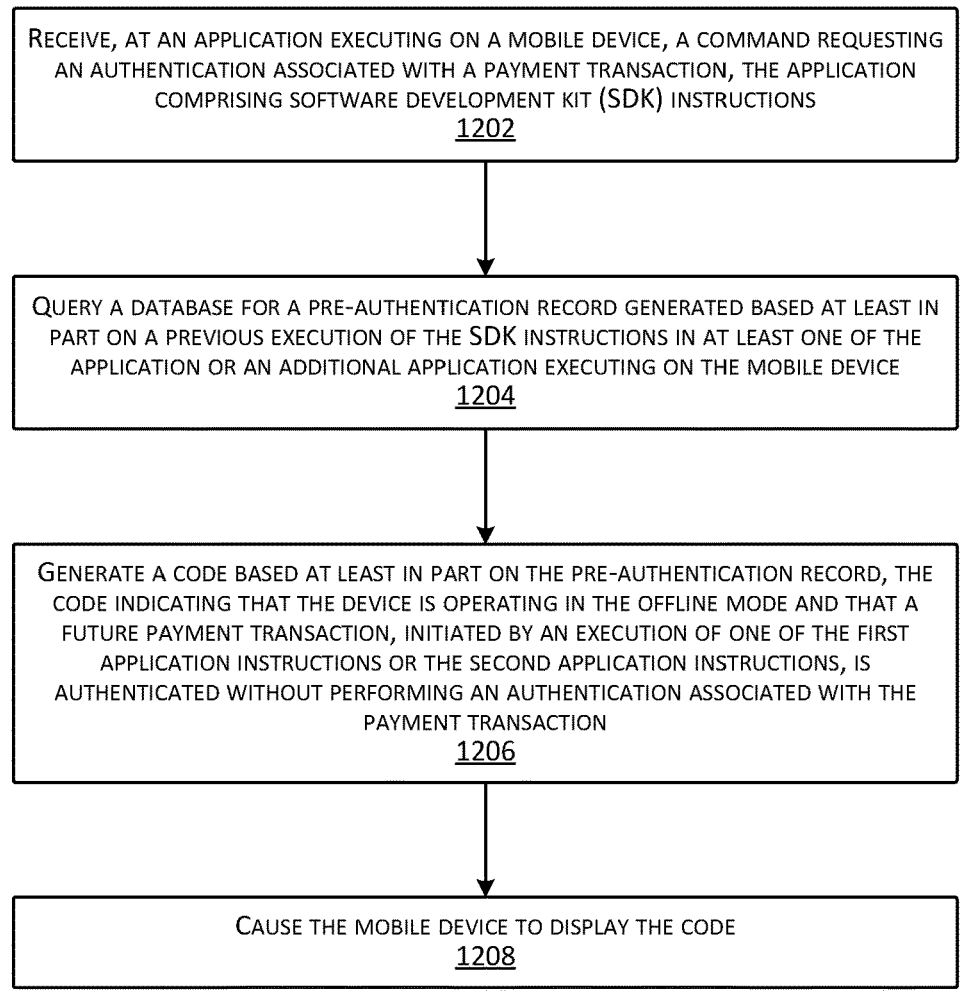
FIG. 12 illustrates another example process for authenticating a payment transaction when a mobile device is operating in an offline mode by generating a code to be displayed on a mobile device using a pre-authentication record.

FIG. 12 illustrates another example process 1200 for authenticating a payment transaction when a mobile device is operating in an offline mode by generating a code to be displayed on a mobile device using a pre-authentication record. The order in which the operations or steps are described is not intended to be construed as a limitation, and any number of the described operations may be combined in any order and/or in parallel to implement process 1200.

At block 1202, the process 1200 may include receiving, at an application executing on a mobile device, a command requesting an authentication associated with a payment transaction. In some examples, the application may comprise software development kit (SDK) instructions. In some examples, the SDK may correspond to the SDK 130 as described with respect to FIG. 1.

At block 1204, the process 1200 may include querying a database for a pre-authentication record generated based at least in part on a previous execution of the SDK instructions in at least one of the application or an additional application executing on the mobile device.

At block 1206, the process 1200 may include generating a code based at least in part on the pre-authentication record. In some examples, the code may indicate that the payment transaction is authenticated without performing the authentication associated with the payment transaction.

At block 1208, the process 1200 may include causing the mobile device to display the code.

In some examples, the pre-authentication record is a first pre-authentication record of a number of pre-authentication records, and/or individual ones of the pre-authentication records may be configured as an authentication for a single transaction.

In some examples, the pre-authentication record may be encrypted as an encrypted pre-authentication record based at least in part on a key. Additionally, or alternatively, the process 1200 may include presenting a request for authentication input from a user of the mobile device. In some examples, the authentication input may include a biometric input, such as, for example, a face scan and/or a fingerprint scan. Additionally, or alternatively, the process 1200 may include, based at least in part on receiving the authentication input from the user of the mobile device, granting access to the key. Additionally, or alternatively, the process 1200 may include decrypting, based at least in part on the key, the encrypted pre-authentication record to generate a decrypted authentication record. Additionally, or alternatively, the process 1200 may include generating the code based at least in part on the decrypted authentication record.

In some examples, the code may be at least one of a Quick Response (QR) code or a Near Field Communication (NFC) code.

In some examples, the pre-authentication record may be a first pre-authentication record that is associated with a key and/or may be valid for a first period of time. Additionally, or alternatively, the process 1200 may include, based at least in part on an expiration of the first period of time, generating a second pre-authentication record that is valid for a second period of time that is substantially similar to the first period of time. In some examples, the second-pre-authentication record may be based at least in part on the first pre-authentication record and the key. Additionally, or alternatively, the process 1200 may include storing the second pre-authentication record in the database. In some examples, storing the second pre-authentication record may comprise overwriting the first pre-authentication record.

In some examples, the pre-authentication record may be associated with at least one of an identifier of at least one of the application or the additional application, a transaction amount, information associated with a user of the mobile device, a merchant identifier, and/or information associated with a merchant.

Additionally, or alternatively, the process 1200 may include determining that the mobile device is operating in an offline mode. Additionally, or alternatively, the process 1200 may include causing the mobile device to display the code based at least in part on determining that the device is operating in the offline mode.

Figure 13:
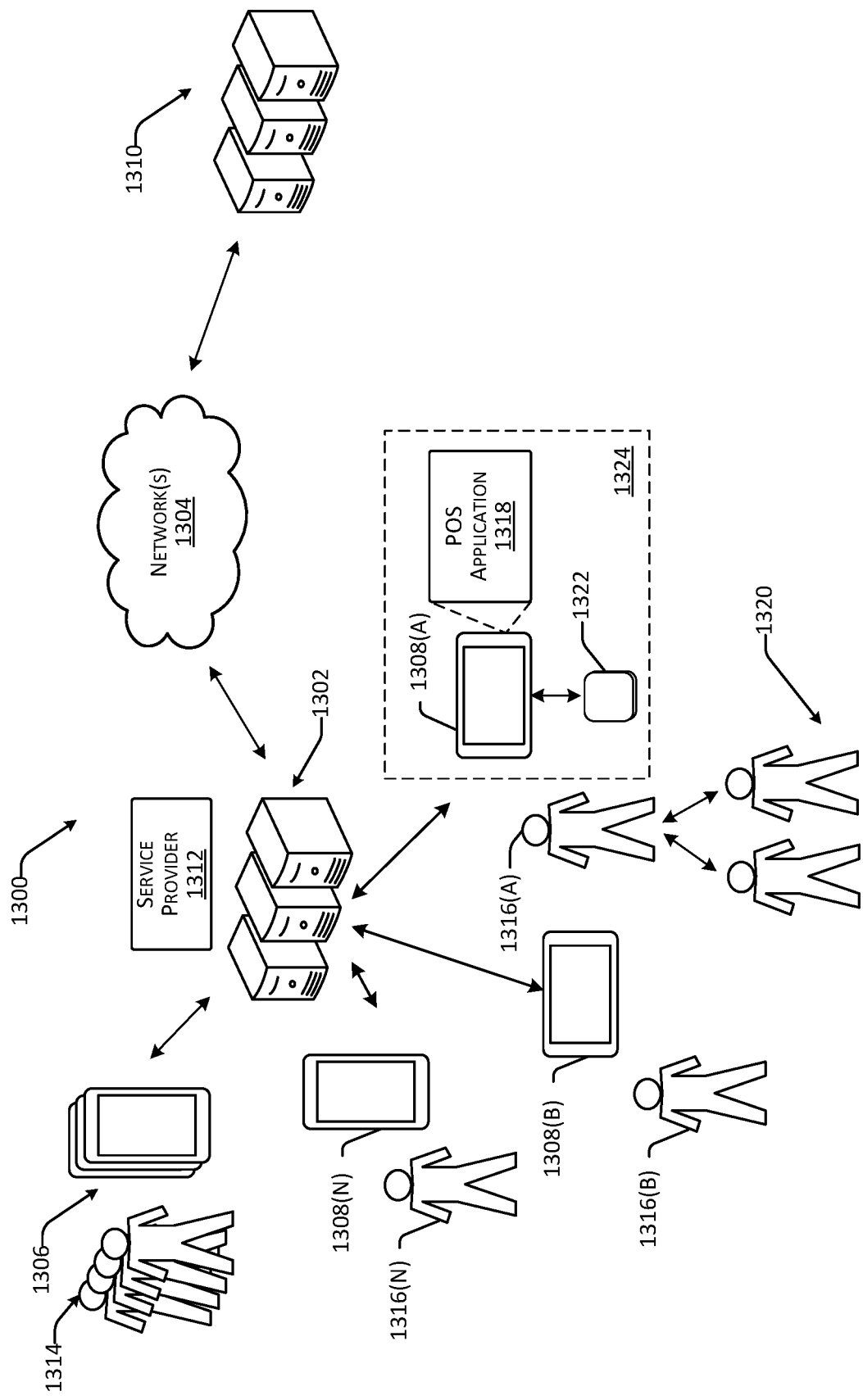
FIG. 13 illustrates an example merchant ecosystem for facilitating, among other things, techniques described herein.

FIG. 13 illustrates an example environment 1300. The environment 1300 includes server computing device(s) 1302 that can communicate over a network 1304 with user devices 1306 (which, in some examples can be merchant devices 1308 (individually, 1308(A)-1308(N))) and/or server computing device(s) 1310 associated with third-party service provider(s). The server computing device(s) 1302 can be associated with a service provider 1312 that can provide one or more services for the benefit of users 1314, as described below. Actions attributed to the service provider 1312 can be performed by the server computing device(s) 1302.

In at least one example, the service provider 1312 can correspond to the authentication service provider described above. In at least one example, the server computing device(s) 1302 can correspond to the server(s) 104 and the network(s) 1304 can correspond to the network(s) 108 described above with reference to FIG. 1. In at least one example, the 3DS service providers and/or payment method issuer described above with reference to FIG. 1 can be associated with the server computing device(s) 1310 associated with third-party service provider(s).

The environment 1300 can facilitate the delegation of authentication across third-party applications and offline delegated payment authentication for a user device. As described above, a user may wish to purchase an item through a third-party merchant application. Such a transaction may require a user to register and/or authentication a payment method with the third-party application. The service provider 1312 may determine if two separate third-party applications are executing on the same user device, and may delegate an existing authentication record from a first application to a second unregistered application. Additionally, a user may wish to utilize a user device as a standalone payment instrument at a brick and mortar location of a merchant. In scenarios where such a user device does not have access to an internet connection, the service provider 1312 may issue pre-authentication records configured to generate QR codes for presentation at a POS device, where the authentication may be delegated via a network from the POS device to a backend authentication server associated with the service provider 1312.

In at least one example, techniques performed by the environment 1300 may alleviate the need for users to register and/or perform tedious authentication techniques for every transaction conducted across each separate third-party merchant app in which the user wishes to conduct a transaction. Additionally, or alternatively, the techniques performed by the environment 1300 may configure a user device having no access to the internet into a standalone payment instrument.

As described above, analytical models may utilize probabilistic signals to correlate events that are happening between a first application and second application. An authentication record in the first application may then be shared to a second application, such that a customer's payment made using the second application need not go through an initial enrollment authentication process, leading to less friction during a payment experience. Customer device and application specific private/public key pairs are integrated into the process to share the payment authentication via network communications in a secure manner. Additionally, a code may be generated based on a pre-authenticated cryptogram received from an authentication server and stored locally on a device. The code is then scanned at a POS system which requires logic to extract and forward an authentication value included in the code to the authentication server. The authentication SDK is integrated into the device and the POS system in a way that secures private network communications, while avoiding technical disadvantages to prior art systems with regard to multi-factor authentication, offline authentication, and security constraints.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as buyers, customers, sellers, merchants, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider 1312 or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, biometric input, and/or any other type of input.

In at least one example, the merchant device 104 and the buyer device 102 described above in FIG. 1 can comprise user devices 1306 as described herein. Similarly, the merchant and the buyer can comprise users 1314 as used herein.

In at least one example, the users 1314 can include merchants 1316 (individually, 1316(A)-1316(N)). In an example, the merchants 1316 can operate respective merchant devices 1308, which can be user devices 1306 configured for use by merchants 1316. For the purpose of this discussion, a "merchant" can be any entity that offers items (e.g., goods or services) for purchase or other means of acquisition (e.g., rent, borrow, barter, etc.). The merchants 1316 can offer items for purchase or other means of acquisition via brick-and-mortar stores, mobile stores (e.g., pop-up shops, food trucks, etc.), online stores, combinations of the foregoing, and so forth. In some examples, at least some of the merchants 1316 can be associated with a same entity but can have different merchant locations and/or can have franchise/franchisee relationships. In additional or alternative examples, the merchants 1316 can be different merchants. That is, in at least one example, the merchant 1316(A) is a different merchant than the merchant 1316(B) and/or the merchant 1316(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EINs), lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1308 can have an instance of a POS application 1318 stored thereon. The POS application 1318 can configure the merchant device 1308 as a POS terminal, which enables the merchant 1316(A) to interact with one or more buyers 1320. As described above, the users 1314 can include buyers, such as the buyers 1320 shown as interacting with the merchant 1316(A). For the purpose of this discussion, a "buyer" can be any entity that acquires items from merchants. While only two buyers 1320 are illustrated in FIG. 13, any number of buyers 1320 can interact with the merchants 1316. Further, while FIG. 13 illustrates the buyers 1320 interacting with the merchant 1316(A), the buyers 1320 can interact with any of the merchants 1316.

In at least one example, interactions between the buyers 1320 and the merchants 1316 that involve the exchange of funds (from the buyers 1320) for items (from the merchants 1316) can be referred to as "POS transactions" and/or "transactions." In at least one example, the POS application 1318 can determine transaction data associated with the POS transactions. Transaction data can include payment information, which can be obtained from a reader device 1322 associated with the merchant device 1308(A), user authentication data, purchase amount information, point-of-purchase information (e.g., item(s) purchased, date of purchase, time of purchase, etc.), etc. The POS application 1318 can send transaction data to the server computing device(s) 1302. Furthermore, the POS application 1318 can present a UI to enable the merchant 1316(A) to interact with the POS application 1318 and/or the service provider 1312 via the POS application 1318.

In at least one example, the merchant device 1308(A) can be a special-purpose computing device configured as a POS terminal (via the execution of the POS application 1318). In at least one example, the POS terminal may be connected to a reader device 1322, which is capable of accepting a variety of payment instruments, such as credit cards, debit cards, gift cards, short-range communication-based payment instruments, and the like, as described below. In at least one example, the reader device 1322 can plug in to a port in the merchant device 1308(A), such as a microphone port, a headphone port, an audio-jack, a data port, or other suitable port. In additional or alternative examples, the reader device 1322 can be coupled to the merchant device 1308(A) via another wired or wireless connection, such as via a Bluetooth®, BLE, and so on. Additional details are described below with reference to FIG. 14. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1322, and communicate with the server computing device(s) 1302, which can provide, among other services, a payment processing service. The server computing device(s) 1302 associated with the service provider 1312 can communicate with server computing device(s) 1310, as described below. In this manner, the POS terminal and reader device 1322 may collectively process transaction(s)

between the merchants 1316 and buyers 1320. In some examples, POS terminals and reader devices can be configured in one-to-one pairs. In other examples, the POS terminals and reader devices can be configured in many-to-one pairs (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to the buyers 1320. In additional or alternative examples, the POS terminal can have a display integrated therein for presenting information to the buyers 1320. POS systems, such as the POS system 1324, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1320 and his or her payment instrument are physically present at the time of the transaction. Card-present transactions may be processed by swipes, dips, taps, or any other interaction between a physical payment instrument (e.g., a card), or otherwise present payment instrument, and a reader device 1322 whereby the reader device 1322 is able to obtain payment data from the payment instrument. A swipe is a card-present transaction where a buyer 1320 slides a card, or other payment instrument, having a magnetic strip through a reader device 1322 that captures payment data contained in the magnetic strip. A dip is a card-present transaction where a buyer 1320 inserts a payment instrument having an embedded microchip (i.e., chip) into a reader device 1322 first. The dipped payment instrument remains in the payment reader until the reader device 1322 prompts the buyer 1320 to remove the card, or other payment instrument. While the payment instrument is in the reader device 1322, the microchip can create a one-time code which is sent from the POS system 1324 to the server computing device(s) 1310 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1320 may tap or hover his or her payment instrument (e.g., card, electronic device such as a smart phone running a payment application, etc.) over a reader device 1322 to complete a transaction via short-range communication (e.g., NFC, RFID, Bluetooth®, BLE, etc.). Short-range communication enables the payment instrument to exchange information with the reader device 1322. A tap may also be called a contactless payment.

A CNP transaction is a transaction where a card, or other payment instrument, is not physically present at the POS such that payment data is required to be manually keyed in (e.g., by a merchant, buyer, etc.), or payment data is required to be recalled from a card-on-file data store, to complete the transaction.

The POS system 1324, the server computing device(s) 1302, and/or the server computing device(s) 1310 may exchange payment information and transaction data to determine whether transactions are authorized. For example, the POS system 1324 may provide encrypted payment data, user authentication data, purchase amount information, point-of-purchase information, etc. (collectively, transaction data) to server computing device(s) 1302 over the network(s) 1304. The server computing device(s) 1302 may send the transaction data to the server computing device(s) 1310. As described above, in at least one example, the server computing device(s) 1310 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1310 associated therewith) can send a fund transfer request to a server computing device of a card payment network (e.g., Mastercard®, VISA®, etc.) to determine whether the transaction is authorized or deficient. In at least one example, the service provider 1312 can serve as an acquirer and connect directly with the card payment network.

The card payment network (e.g., the server computing device(s) 1310 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1310 associated therewith) can make a determination as to whether the buyer has the capacity to absorb the relevant charge associated with the payment transaction. In at least one example, the service provider 1312 can serve as an issuer and/or can partner with an issuer. The transaction is either approved or rejected by the issuer and/or the card payment network (e.g., the server computing device(s) 1310 associated therewith), and a payment authorization message is communicated from the issuer to the POS device via a path opposite of that described above, or via an alternate path.

As described above, the server computing device(s) 1310, which can be associated with payment service provider(s), may determine whether the transaction is authorized based on the transaction data, as well as information relating to parties to the transaction (e.g., the buyer 1320 and/or the merchant 1316(A)). The server computing device(s) 1310 may send an authorization notification over the network(s) 1304 to the server computing device(s) 1302, which may send the authorization notification to the POS system 1324 over the network(s) 1304 to indicate whether the transaction is authorized. The server computing device(s) 1302 may also transmit additional information such as transaction identifiers to the POS system 1324. In one example, the server computing device(s) 1302 may include a merchant application and/or other functional components for communicating with the POS system 1324 and/or the server computing device(s) 1310 to authorize or decline transactions.

Based on the authentication notification that is received by the POS system 1324 from server computing device(s) 1302, the merchant 1316(A) may indicate to the buyer 1320 whether the transaction has been approved. In some examples, approval may be indicated at the POS system 1324, for example, at a display of the POS system 1324. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1312 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1314 can access all of the services of the service provider 1312. In other examples, the users 1314 can have gradated access to the services, which can be based on risk tolerance, IDV outputs, subscriptions, and so on. In at least one example, access to such services can be availed to the merchants 1316 via the POS application 1318. In additional or alternative examples, each service can be associated with its own access point (e.g., application, web browser, etc.).

The service provider 1312 can offer payment processing services for processing payments on behalf of the merchants 1316, as described above. For example, the service provider 1312 can provision payment processing software, payment processing hardware and/or payment processing services to merchants 1316, as described above, to enable the merchants 1316 to receive payments from the buyers 1320 when conducting POS transactions with the buyers 1320. For instance, the service provider 1312 can enable the merchants 1316 to receive cash payments, payment card payments, and/or electronic payments from buyers 1320 for POS transactions and the service provider 1312 can process transactions on behalf of the merchants 1316.

As the service provider 1312 processes transactions on behalf of the merchants 1316, the service provider 1312 can maintain accounts or balances for the merchants 1316 in one or more ledgers. For example, the service provider 1312 can analyze transaction data received for a transaction to determine an amount of funds owed to a merchant 1316(A) for the transaction. In at least one example, such an amount can be a total purchase price less fees charged by the service provider 1312 for providing the payment processing services. Based on determining the amount of funds owed to the merchant 1316(A), the service provider 1312 can deposit funds into an account of the merchant 1316(A). The account can have a stored balance, which can be managed by the service provider 1312. The account can be different from a conventional bank account at least because the stored balance is managed by a ledger of the service provider 1312 and the associated funds are accessible via various withdrawal channels including, but not limited to, scheduled deposit, same-day deposit, instant deposit, and a linked payment instrument.

A scheduled deposit can occur when the service provider 1312 transfers funds associated with a stored balance of the merchant 1316(A) to a bank account of the merchant 1316(A) that is held at a bank or other financial institution (e.g., associated with the server computing device(s) 1310). Scheduled deposits can occur at a prearranged time after a POS transaction is funded, which can be a business day after the POS transaction occurred, or sooner or later. In some examples, the merchant 1316(A) can access funds prior to a scheduled deposit. For instance, the merchant 1316(A) may have access to same-day deposits (e.g., wherein the service provider 1312 deposits funds from the stored balance to a linked bank account of the merchant on a same day as POS transaction, in some examples prior to the POS transaction being funded) or instant deposits (e.g., wherein the service provider 1312 deposits funds from the stored balance to a linked bank account of the merchant on demand, such as responsive to a request). Further, in at least one example, the merchant 1316(A) can have a payment instrument that is linked to the stored balance that enables the merchant to access the funds without first transferring the funds from the account managed by the service provider 1312 to the bank account of the merchant 1316(A).

In at least one example, the service provider 1312 may provide inventory management services. That is, the service provider 1312 may provide inventory tracking and reporting. Inventory management services may enable the merchant 1316(A) to access and manage a database storing data associated with a quantity of each item that the merchant 1316(A) has available (i.e., an inventory). Furthermore, in at least one example, the service provider 1312 can provide catalog management services to enable the merchant 1316(A) to maintain a catalog, which can be a database storing data associated with items that the merchant 1316(A) has available for acquisition (i.e., catalog management services). In at least one example, the catalog may include a plurality of data items and a data item of the plurality of data items may represent an item that the merchant 1361(A) has available for acquisition. The service provider 1312 can offer recommendations related to pricing of the items, placement of items on the catalog, and multi-party fulfilment of the inventory.

In at least one example, the service provider 1312 can provide business banking services, which allow the merchant 1316(A) to track deposits (from payment processing and/or other sources of funds) into an account of the merchant 1316(A), payroll payments from the account (e.g., payments to employees of the merchant 1316(A)), payments to other merchants (e.g., business-to-business) directly from the account or from a linked debit card, withdrawals made via scheduled deposit and/or instant deposit, etc. Furthermore, the business banking services can enable the merchant 1316(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1316 to visualize their cash flow to track their financial health, set aside money for upcoming obligations (e.g., savings), organize money around goals, etc.

In at least one example, the service provider 1312 can provide financing services and products, such as via business loans, consumer loans, fixed term loans, flexible term loans, and the like. In at least one example, the service provider 1312 can utilize one or more risk signals to determine whether to extend financing offers and/or terms associated with such financing offers.

In at least one example, the service provider 1312 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1312 can offer different types of capital loan products. For instance, in at least one example, the service provider 1312 can offer a daily repayment loan product, wherein a capital loan is repaid daily, for instance, from a portion of transactions processed by the payment processing service on behalf of the borrower. Additionally, and/or alternatively, the service provider 1312 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally, or alternatively, the service provider 1312 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1316. The service provider 1312 can create the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1312 (e.g., from payments owed to the merchant from payments processed on behalf of the merchant, funds transferred to the merchant, etc.). The service provider 1312 can offer specific financial products, such as payment instruments, tied specifically to the loan products. For example, in one implementation, the server provider 1312 associates capital to a merchant or buyer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1312 can provide web-development services, which enable users 1314 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1316. In at least one example, the service provider 1312 can recommend and/or create content items to supplement omni-channel presences of the merchants 1316. That is, if a merchant of the merchants 1316 has a web page, the service provider 1312—via the web-development or other services—can recommend and/or create additional content items to be presented via other channel(s), such as social media, email, etc.

Furthermore, the service provider 1312 can provide payroll services to enable employers to pay employees for work performed on behalf of employers. In at least one example, the service provider 1312 can receive data that includes time worked by an employee (e.g., through imported timecards and/or POS interactions), sales made by the employee, gratuities received by the employee, and so forth. Based on such data, the service provider 1312 can make payroll payments to employee(s) on behalf of an employer via the payroll service. For instance, the service provider 1312 can facilitate the transfer of a total amount to be paid out for the payroll of an employee from the bank of the employer to the bank of the service provider 1312 to be used to make payroll payments. In at least one example, when the funds have been received at the bank of the service provider 1312, the service provider 1312 can pay the employee, such as by check or direct deposit, often a day, a week, or more after when the work was actually performed by the employee. In additional or alternative examples, the service provider 1312 can enable employee(s) to receive payments via same-day or instant deposit based at least in part on risk and/or reliability analyses performed by the service provider 1312.

Moreover, in at least one example, the service provider 1312 can provide employee management services for managing schedules of employees. Further, the service provider 1312 can provide appointment services for enabling users 1314 to set schedules for scheduling appointments and/or users 1314 to schedule appointments.

In some examples, the service provider 1312 can provide restaurant management services to enable users 1314 to make and/or manage reservations, to monitor front-of-house and/or back-of-house operations, and so on. In such examples, the merchant device(s) 1308 and/or server computing device(s) 1302 can be configured to communicate with one or more other computing devices, which can be located in the front-of-house (e.g., POS device(s)) and/or back-of-house (e.g., kitchen display system(s) (KDS)). In at least one example, the service provider 1312 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1312 can provide fulfilment services, which can use couriers for delivery, wherein couriers can travel between multiple locations to provide delivery services, photography services, etc. Couriers can be users 1314 who can travel between locations to perform services for a requesting user 1314 (e.g., deliver items, capture images, etc.). In some examples, the courier can receive compensation from the service provider 1312. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1312 can receive requests for courier services, automatically assign the requests to active couriers, and communicate dispatch instructions to couriers via user interface (e.g., application, web browser, or other access point) presented via respective devices 1306.

In some examples, the service provider 1312 can provide omni-channel fulfillment services. For instance, if a buyer places an order with a merchant and the merchant cannot fulfill the order because one or more items are out of stock or otherwise unavailable, the service provider 1312 can leverage other merchants and/or sales channels that are part of the platform of the service provider 1312 to fulfill the buyer's order. That is, another merchant can provide the one or more items to fulfill the order of the buyer. Furthermore, in some examples, another sales channel (e.g., online, brick-and-mortar, etc.) can be used to fulfill the order of the buyer.

In some examples, the service provider 1312 can enable conversational commerce via conversational commerce services, which can use one or more machine learning mechanisms to analyze messages exchanged between two or more users 1314, voice inputs into a virtual assistant or the like, to determine intents of user(s) 1314. In some examples, the service provider 1312 can utilize determined intents to automate buyer service, offer promotions, provide recommendations, or otherwise interact with buyers in real-time. In at least one example, the service provider 1312 can integrate products and services, and payment mechanisms into a communication platform (e.g., messaging, etc.) to enable buyers to make purchases, or otherwise transact, without having to call, email, or visit a web page or other channel of a merchant. That is, conversational commerce alleviates the need for buyers to toggle back and forth between conversations and web pages to gather information and make purchases.

In at least one example, the service provider 1312 can provide a peer-to-peer payment service that enables peer-to-peer payments between two or more users 1314. In at least one example, the service provider 1312 can communicate with instances of a payment application (or other access point) installed on devices 1306 configured for operation by users 1314. In an example, an instance of the payment application executing on a first device operated by a payor can send a request to the service provider 1312 to transfer an amount of funds (e.g., fiat currency or non-fiat currency such as cryptocurrency, securities, and related assets) from an account of the payor to an account of a payee (e.g., a peer-to-peer payment). The service provider 1312 can facilitate the transfer and can send a notification to an instance of the payment application executing on a second mobile device operated by the payee that the transfer is in process (or has been completed). In some examples, the service provider 1312 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1312 funds the request to payee on behalf of the payor, to speed up the transfer process and compensate for any lags that may be attributed to payor's financial network.

In some implementations, the service provider 1312 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1306.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1312. For instance, the service provider 1312 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server computing device(s) 1302 (which, in such an example can be called a "messaging server"). In some instances, the messaging application can include a payment application with messaging capability that enables users of the payment application to communicate with one another. In such instances, the payment application can be executed on the user device 1306 based on instructions transmitted to and from the server computing device(s) 1302 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1312 can create the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1314 may be new to the service provider 1312 such that the user 1314 that has not registered (e.g., subscribed to receive access to one or more services offered by the service provider) with the service provider 1312. The service provider 1312 can offer onboarding services for registering a potential user 1314 with the service provider 1312. In some examples, onboarding can involve presenting various questions, prompts, and the like to a potential user 1314 to obtain information that can be used to create a profile for the potential user 1314. In at least one example, the service provider 1312 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1314 providing all necessary information, the potential user 1314 can be onboarded to the service provider 1312. In such an example, any limited or short-term access to services of the service provider 1312 can be transitioned to more permissive (e.g., less limited) or longer-term access to such services.

The service provider 1312 can be associated with IDV services, which can be used by the service provider 1312 for compliance purposes and/or can be offered as a service, for instance to third-party service providers (e.g., associated with the server computing device(s) 1310). That is, the service provider 1312 can offer IDV services to verify the identity of users 1314 seeking to use or using their services. Identity verification requires a buyer (or potential buyer) to provide information that is used by compliance departments to prove that the information is associated with an identity of a real person or entity. In at least one example, the service provider 1312 can perform services for determining whether identifying information provided by a user 1314 accurately identifies the buyer (or potential buyer) (i.e., Is the buyer who they say they are?).

The service provider 1312 is capable of providing additional or alternative services and the services described above are offered as a sampling of services. In at least one example, the service provider 1312 can exchange data with the server computing device(s) 1310 associated with third-party service providers. Such third-party service providers can provide information that enables the service provider 1312 to provide services, such as those described above. In additional or alternative examples, such third-party service providers can access services of the service provider 1312. That is, in some examples, the third-party service providers can be subscribers, or otherwise access, services of the service provider 1312.

Techniques described herein can be configured to operate in both real-time/online and offline modes. "Online" modes refer to modes when devices are capable of communicating with the service provider 1312 (e.g., the server computing device(s) 1302) and/or the server computing device(s) 1310 via the network(s) 1304. In some examples, the merchant device(s) 1308 are not capable of connecting with the service provider 1312 (e.g., the server computing device(s) 1302) and/or the server computing device(s) 1310, due to a network connectivity issue, for example. In additional or alternative examples, the server computing device(s) 1302 are not capable of communicating with the server computing device(s) 1310 due to network connectivity issue, for example. In such examples, devices may operate in "offline" mode where at least some payment data is stored (e.g., on the merchant device(s) 1308) and/or the server computing device(s) 1302 until connectivity is restored and the payment data can be transmitted to the server computing device(s) 1302 and/or the server computing device(s) 1310 for processing.

In at least one example, the service provider 1312 can be associated with a hub, such as an order hub, an inventory hub, a fulfillment hub and so on, which can enable integration with one or more additional service providers (e.g., associated with the additional server computing device(s) 1310). In some examples, such additional service providers can offer additional or alternative services and the service provider 1312 can provide an interface or other computer-readable instructions to integrate functionality of the service provider 1312 into the one or more additional service providers.

Techniques described herein are directed to services provided via a distributed system of user devices 1306 that are in communication with one or more server computing devices 1302 of the service provider 1312. That is, techniques described herein are directed to a specific implementation—or, a practical application—of utilizing a distributed system of user devices 1306 that are in communication with one or more server computing devices 1302 of the service provider 1312 to perform a variety of services, as described above. The unconventional configuration of the distributed system described herein enables the server computing device(s) 1302 that are remotely-located from end-users (e.g., users 1314) to intelligently offer services based on aggregated data associated with the end-users, such as the users 1314 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1312, and those outside of the control of the service provider 1312, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1314 and user devices 1306. Furthermore, such features are changed dynamically based on the profiles of the users involved interacting with the GUIs. As such, techniques described herein are directed to improvements to computing systems.

Figure 14:
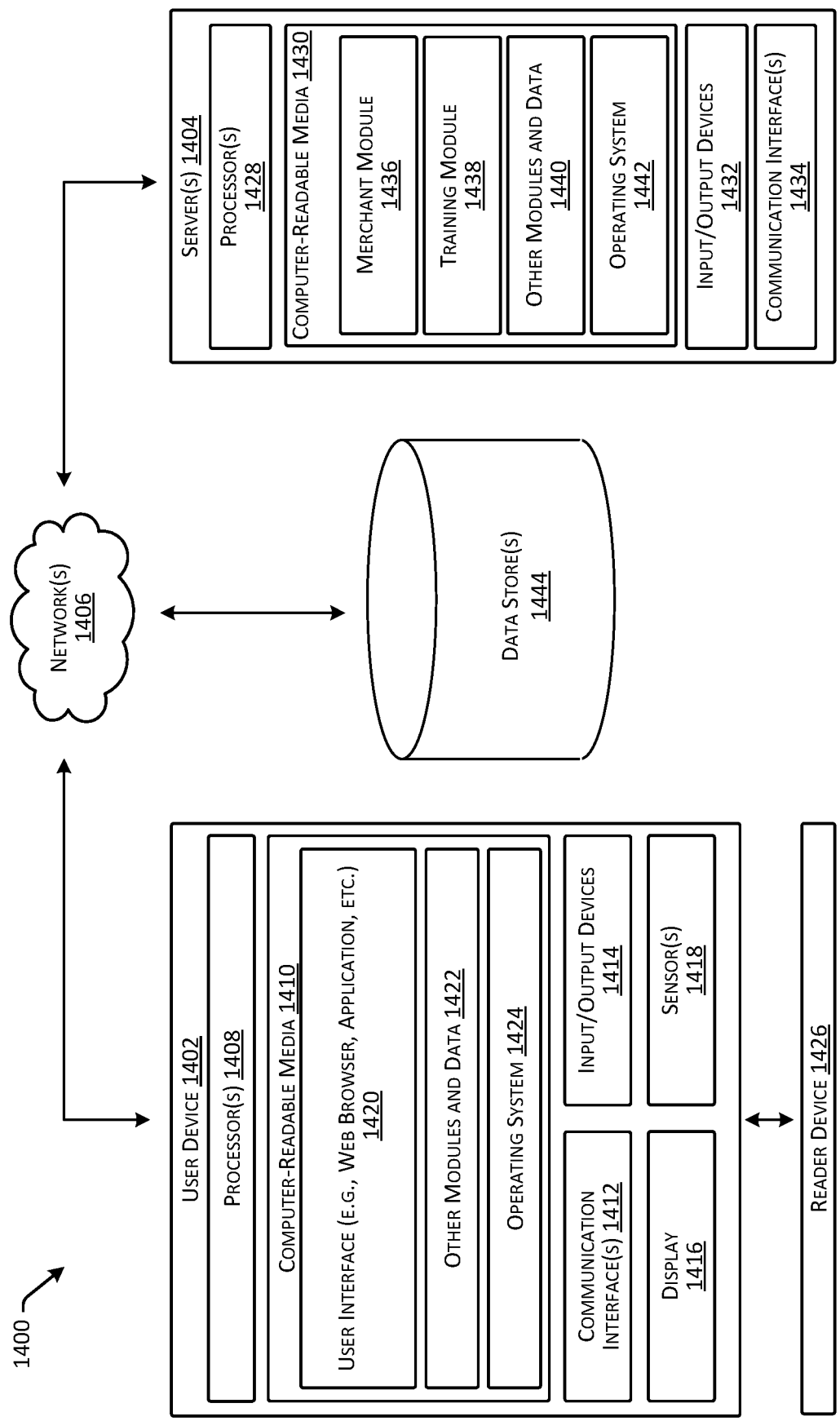
FIG. 14 illustrates additional details associated with individual components of the merchant ecosystem described above in FIG. 13.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 13.

The environment 1400 can facilitate the delegation of authentication across third-party applications and offline delegated payment authentication for a user device. As described above, a user may wish to purchase an item through a third-party merchant application. Such a transaction may require a user to register and/or authentication a payment method with the third-party application. The service provider 1312 may determine if two separate third-party applications are executing on the same user device, and may delegate an existing authentication record from a first application to a second unregistered application. Additionally, a user may wish to utilize a user device as a standalone payment instrument at a brick and mortar location of a merchant. In scenarios where such a user device does not have access to an internet connection, the service provider 1312 may issue pre-authentication records configured to generate QR codes for presentation at a POS device, where the authentication may be delegated via a network from the POS device to a backend authentication server associated with the service provider 1312.

In at least one example, techniques performed by the environment 1400 may alleviate the need for users to register and/or perform tedious authentication techniques for every transaction conducted across each separate third-party merchant app in which the user wishes to conduct a transaction. Additionally, or alternatively, the techniques performed by the environment 1400 may configure a user device having no access to the internet into a standalone payment instrument.

As described above, analytical models may utilize probabilistic signals to correlate events that are happening between a first application and second application. An authentication record in the first application may then be shared to a second application, such that a customer's payment made using the second application need not go through an initial enrollment authentication process, leading to less friction during a payment experience. Customer device and application specific private/public key pairs are integrated into the process to share the payment authentication via network communications in a secure manner. Additionally, a code may be generated based on a pre-authenticated cryptogram received from an authentication server and stored locally on a device. The code is then scanned at a POS system which requires logic to extract and forward an authentication value included in the code to the authentication server. The authentication SDK is integrated into the device and the POS system in a way that secures private network communications, while avoiding technical disadvantages to prior art systems with regard to multi-factor authentication, offline authentication, and security constraints.

As described above, users of platforms (e.g., websites, applications, and other network-based communication tools provided by service providers) leverage tools for online commerce ("ecommerce"), such as, for example, third-party merchant applications for conducting authenticated payment transactions. However, utilizing current technology, completing a registration process from start to finish for each individual third-party application may be a tedious task. Additionally, once a customer has registered a payment method with a third-party application, such authorization and/or authentication techniques may require one or more forms of authentication from the customer when completing a transaction (and any subsequent transactions), such as, for example, an account password, a biometric authentication (e.g., fingerprint scan, face scan, etc.), a two-factor authentication (e.g., a one-time passcode), or the like. Many merchants may attach a verification of such authentication to a payment when sending the payment for processing. That is, customers are often required to leave content they are currently viewing to access another online platform (e.g., a messaging application, browser redirection, or the like) to view additional information, access an additional customer account, and/or otherwise engage in a payment flow to complete the transaction. This friction in the purchasing process detracts from buying engagement with the merchant and could potentially lead to a loss of sale opportunities for the merchant. Additionally, a user relying on a mobile device as a payment instrument may be constrained to only shop at locations where the mobile device may access an internet connection. This friction leads to an indefinite loss of sale opportunities for the merchant. As such, current technology is inefficient and is not user friendly. The environment 1400 described herein enables frictionless (or near-frictionless) registration of payment methods and authentication of transactions without performing a two-factor authentication, and allows a user to utilize a user device as a standalone payment instrument when the user device does not have access to an internet connection. Thus, techniques described herein offer improvements to existing technology.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, modules or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider 1312 associated with the server(s) 1404, or which can be an otherwise dedicated application. In some examples, the user interface 1420 can be one of the user interface(s) 122 described above with reference to FIG. 1. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other modules and data 1422, which can include programs, drivers, etc., and the data used or created by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1312, described above, to provide one or more services. That is, in some examples, the service provider 1312 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby buyers when they leave a geofence, or location can be used to initiate an action responsive to users 1314 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally, or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally, or optionally, the reader device 1426 may also include a biometric sensor to receive and process biometric characteristics and process them as payment instruments, given that such biometric characteristics are registered with the payment processing service provider and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more modules and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one module for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and creating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise or can be provided by the servers and/or services of multiple different buyers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program modules, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider 1312 and/or payment processing service. Functional components stored in the computer-readable media 1430 can optionally include a merchant module 1436, a training module 1438, and one or more other modules and data 1440.

The merchant module 1436 can be configured to receive transaction data from POS systems, such as the POS system 1324 described above with reference to FIG. 13. The merchant module 1436 can transmit requests (e.g., authorization, capture, settlement, etc.) to payment service server computing device(s) to facilitate POS transactions between merchants and buyers. The merchant module 1436 can communicate the successes or failures of the POS transactions to the POS systems. The payment processing component 152 described above with reference to FIG. 1 can correspond to the merchant module 1436.

The training module 1438 can be configured to train models using machine-learning mechanisms. For example, a machine-learning mechanism can analyze training data to train a data model that creates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store(s) associated with the user device(s) 1402 and/or the server(s) 1404 for use at a time after the data models have been trained (e.g., at runtime).

The one or more other modules and data 1440 can include the pre-authentication component 138, the delegation component 140, and/or the correlation component 144, the functionality of which is described, at least partially, above. Further, the one or more other modules and data 1440 can include programs, drivers, etc., and the data used or created by the functional components. Further, the server(s) 1404 can include many other logical, programmatic and physical components, of which those described above are merely examples that are related to the discussion herein.

The one or more "modules" and/or "components" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may create useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. The API(s) 148, described above, can correspond to such.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include data store(s) 1444 that can be configured to store data that is accessible, manageable, and updatable. In some examples, the data store(s) 1444 can be integrated with the user device 1402 and/or the server(s) 1404. In other examples, as shown in FIG. 14, the data store(s) 1444 can be located remotely from the server(s) 1404 and can be accessible to the server(s) 1404. The data store(s) 1444 can comprise multiple databases and/or servers connected locally and/or remotely via the network(s) 1406. The data store(s) 150, described above with reference to FIG. 1, can correspond to the data store(s) 1444.

In at least one example, the data store(s) 1444 can store user profiles, which can include merchant profiles, buyer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The merchant profile can securely store bank account information as provided by the merchant. Further, the merchant profile can store payment information associated with a payment instrument linked to a stored balance of the merchant, such as a stored balance maintained in a ledger by the service provider 1312.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s), described above with reference to FIG. 1, can include or be associated with the merchant profiles and/or buyer profiles described above.

Furthermore, in at least one example, the data store(s) 1444 can store inventory database(s) and/or catalog database(s). As described above, an inventory can store data associated with a quantity of each item that a merchant has available to the merchant. The records described above can be stored in the inventory data store. Furthermore, a catalog can store data associated with items that a merchant has available for acquisition. The data store(s) 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 4-12 for convenience and ease of understanding. However, the methods illustrated are not limited to being performed using components described in FIGS. 1-3B, 13, and 14, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors;
one or more computer-executable instructions that, when executed by the one or more processors, cause the one or more processors to perform operations comprising:
receiving, at a mobile device executing a first application, a command requesting authentication associated with a payment transaction associated with the first application, the first application comprising compiled software development kit (SDK) instructions;
identifying, based at least in part on querying a database, an existing authentication record generated by a previous execution of the compiled SDK instructions in at least one of the first application or a second application executing on the mobile device, wherein the previous execution of the compiled SDK instructions in the second application comprises sending first probabilistic signals associated with the second application to a server;
sending second probabilistic signals associated with the first application to the server;
receiving, from the server, an indication that the first application and the second application are associated with the mobile device; and
sending a response to the command indicating that the payment transaction is authenticated without performing the authentication based at least in part on identifying the existing authentication record and receiving the indication.

2. The system of claim 1, the operations further comprising, based at least in part on failing to identify the existing authentication record:
performing the authentication to authenticate the payment transaction; and
storing an authentication record indicating the authentication to authenticate a future payment transaction by at least one of the first application or the second application.

3. The system of claim 2, the operations further comprising:
causing the first application to redirect to the second application to perform the authentication to authenticate the payment transaction; and
wherein storing the authentication record comprises at least one of:
storing the authentication record locally on the mobile device in association with the first application;
storing the authentication record locally on the mobile device in association with the second application; or
storing the authentication record remotely on a server in association with the second application.

4. The system of claim 1, wherein the authentication record is encrypted as an encrypted authentication record based at least in part on a key, and the operations further comprising:
presenting a request for authentication input from a user of the mobile device;
based at least in part on receiving the authentication input from the user of the mobile device, granting access to the key;
decrypting, based at least in part on the key, the encrypted authentication record to generate a decrypted authentication record; and
sending the response to the command based at least in part on the decrypted authentication record.

5. The system of claim 1, wherein the existing authentication record is generated by the previous execution of the compiled SDK instructions in the second application and is associated with a first key, and the operations further comprising:
based at least in part on the first probabilistic signals and the second probabilistic signals, generating a second key associated with the existing authentication record, the first probabilistic signals and the second probabilistic signals indicating a correlation between the first application and the second application, and the second key being associated with the first application; and
wherein identifying the existing authentication record is based at least in part on the second key.

6. The system of claim 1, wherein
identifying the existing authentication record is based at least in part on the indication.

7. The system of claim 1, wherein the database is stored remotely on a server and the existing authentication record is associated with a key, and the operations further comprising:
receiving a cryptographic challenge requesting a verification that the mobile device has access to the key;
presenting a request for authentication input from a user of the mobile device;
based at least in part on receiving the authentication input from the user of the mobile device, sending a response to the cryptographic challenge indicating that the mobile device has access to the key; and
wherein identifying the existing authentication record is based at least in part on sending the response to the cryptographic challenge.

8. The system of claim 1, wherein the database is one of stored locally on the mobile device or stored remotely on a server associated with a software developer of the SDK.

9. A computer-implemented method comprising:
receiving, at a first application executing on a mobile device, a first command requesting authentication associated with a first payment transaction, the first application comprising compiled software development kit (SDK) instructions;
querying a database for an existing authentication record generated by a previous execution of the compiled SDK instructions in at least one of the first application or a second application executing on the mobile device;
generating an authentication record by performing an authentication to authenticate the payment transaction based at least in part on failing to identify the existing authentication record;
storing the authentication record indicating the authentication to authenticate a future payment transaction by at least one of the first application or the second application; and
sending a response to the first command, the response including an indication that the first payment transaction is authenticated based at least in part on performing the authentication and first probabilistic signals associated with the first application.

10. The computer-implemented method of claim 9, further comprising:
receiving, at the second application, a second command requesting authentication associated with a second payment transaction initiated, the second application comprising the compiled SDK instructions;
querying, by the second application, the database for the authentication record indicating the authentication to authenticate the future payment transaction; and based at least in part on identifying the authentication record, sending a response to the second command, the response indicating that the payment transaction is authenticated without performing the authentication.

11. The computer-implemented method of claim 10, wherein the existing authentication record is generated by the previous execution of the compiled SDK instructions in the second application and is associated with a first key, and the computer-implemented method further comprising:
    based at least in part on second probabilistic signals associated with the mobile device, generating a second key associated with the existing authentication record, the probabilistic signals indicating a correlation between the first application and the second application, and the second key being associated with the first application; and
    wherein identifying the existing authentication record is based at least in part on the second key.

12. The computer-implemented method of claim 10, wherein the previous execution of the compiled SDK instructions in the second application comprises sending second probabilistic signals associated with the second application to a server, and the computer-implemented method further comprising:
    sending the first probabilistic signals associated with the first application to the server;
    receiving, from the server, an indication that the first application and the second application are associated with the mobile device; and
    wherein identifying the existing authentication record is based at least in part on the indication.

13. The computer-implemented method of claim 9, further comprising:
    causing the first application to redirect to the second application to perform the authentication to authenticate the payment transaction; and
    wherein storing the authentication record comprises at least one of:
        storing the authentication record locally on the mobile device in association with the first application;
        storing the authentication record locally on the mobile device in association with the second application; or
        storing the authentication record remotely on a server in association with the second application.

14. The computer-implemented method of claim 9, wherein the existing authentication record is encrypted as an encrypted existing authentication record based at least in part on a key, and the computer-implemented method further comprising:
    presenting a request for authentication input from a user of the mobile device;
    based at least in part on receiving the authentication input from the user of the mobile device, granting access to the key;
    decrypting, based at least in part on the key, the encrypted existing authentication record to generate a decrypted existing authentication record; and
    sending a response to the first command based at least in part on the decrypted existing authentication record.

15. The computer-implemented method of claim 9, wherein the database is one of stored locally on the mobile device or stored remotely on a server associated with a software developer of the SDK.

16. A computer-implemented method comprising:
    receiving, at a mobile device executing a first application, a command requesting authentication associated with a payment transaction associated with the first application, the first application comprising compiled software development kit (SDK) instructions;
    identifying, based at least in part on querying a database, an existing authentication record generated by a previous execution of the compiled SDK instructions in at least one of the first application or a second application executing on the mobile device, wherein the previous execution of the compiled SDK instructions in the second application comprises sending first probabilistic signals associated with the second application to a server;
    sending second probabilistic signals associated with the first application to the server;
    receiving, from the server, an indication that the first application and the second application are associated with the mobile device; and
    sending a response to the command indicating that the payment transaction is authenticated without performing the authentication based at least in part on identifying the existing authentication record and receiving the indication.

17. The computer-implemented method of claim 16, further comprising, based at least in part on failing to identify the existing authentication record:
    performing the authentication to authenticate the payment transaction; and
    storing an authentication record indicating the authentication to authenticate a future payment transaction by at least one of the first application or the second application.

18. The computer-implemented method of claim 17, further comprising:
    causing the first application to redirect to the second application to perform the authentication to authenticate the payment transaction; and
    wherein storing the authentication record comprises at least one of:
        storing the authentication record locally on the mobile device in association with the first application;
        storing the authentication record locally on the mobile device in association with the second application; or
        storing the authentication record remotely on a server in association with the second application.

19. The computer-implemented method of claim 16, wherein the authentication record is encrypted as an encrypted authentication record based at least in part on a key, and the method further comprising:
    presenting a request for authentication input from a user of the mobile device;
    based at least in part on receiving the authentication input from the user of the mobile device, granting access to the key;
    decrypting, based at least in part on the key, the encrypted authentication record to generate a decrypted authentication record; and
    sending the response to the command based at least in part on the decrypted authentication record.

20. The computer-implemented method of claim 16, wherein the existing authentication record is generated by the previous execution of the compiled SDK instructions in the second application and is associated with a first key, and the method further comprising:
    based at least in part on the first probabilistic signals and the second probabilistic signals, generating a second key associated with the existing authentication record, the first probabilistic signals and the second probabilistic signals indicating a correlation between the first application and the second application, and the second key being associated with the first application; and wherein identifying the existing authentication record is based at least in part on the second key.

* * * * *